(12) United States Patent
Abotabl et al.

(10) Patent No.: US 12,108,442 B2
(45) Date of Patent: Oct. 1, 2024

(54) MITIGATING CLUTTER REFLECTION IN FULL-DUPLEX MODE OPERATION

(71) Applicant: QUALCOMM Incorporated, San Diego, CA (US)

(72) Inventors: Ahmed Attia Abotabl, San Diego, CA (US); Muhammad Sayed Khairy Abdelghaffar, San Jose, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 498 days.

(21) Appl. No.: 17/402,326

(22) Filed: Aug. 13, 2021

(65) Prior Publication Data

US 2022/0086903 A1 Mar. 17, 2022

Related U.S. Application Data

(60) Provisional application No. 63/077,413, filed on Sep. 11, 2020.

(51) Int. Cl.
*H04W 74/0808* (2024.01)
*H04L 5/14* (2006.01)
*H04W 16/28* (2009.01)

(52) U.S. Cl.
CPC .......... *H04W 74/0808* (2013.01); *H04L 5/14* (2013.01); *H04W 16/28* (2013.01)

(58) Field of Classification Search
CPC .... H04W 74/0808; H04W 16/28; H04L 5/14; H04L 5/0044; H04L 5/0023
See application file for complete search history.

(56) References Cited

U.S. PATENT DOCUMENTS

| | | | |
|---|---|---|---|
| 2002/0102941 A1* | 8/2002 | Kuiri ..................... | H04W 36/20 455/67.11 |
| 2009/0279488 A1* | 11/2009 | Zheng .................. | H04L 5/0005 370/329 |
| 2011/0218007 A1* | 9/2011 | Kimura ............... | H04W 72/541 455/512 |
| 2016/0182104 A1* | 6/2016 | Xue ..................... | H04J 11/0056 455/78 |
| 2017/0085358 A1* | 3/2017 | Huberman ........... | H04B 7/0456 |
| 2018/0136326 A1* | 5/2018 | Schuck ................ | G01S 13/583 |
| 2018/0167832 A1* | 6/2018 | Fang .................... | H04W 24/08 |
| 2018/0173230 A1* | 6/2018 | Goldman-Shenhar ...................... B60W 50/08 |
| 2018/0294871 A1* | 10/2018 | Kosseifi ............... | B64C 39/024 |
| 2021/0028542 A1* | 1/2021 | Morin .................. | H01Q 3/2617 |
| 2022/0272753 A1* | 8/2022 | Hakola ................. | H04B 7/086 |

* cited by examiner

*Primary Examiner* — Christine Ng
(74) *Attorney, Agent, or Firm* — ArentFox Schiff LLP

(57) ABSTRACT

An apparatus (e.g., a user equipment or a base station) may be configured to mitigating clutter reflection in full-duplex mode operation. In some aspects, the wireless apparatus may perform transmit operations over a channel and determine a clutter context of the wireless apparatus. Further, the wireless apparatus may compare a sensed power level to a context threshold associated with the clutter context, the sensed power level indicating a power sensed on the channel by the wireless apparatus, and determine whether to operate on the channel in a full-duplex mode based on the comparing.

14 Claims, 10 Drawing Sheets

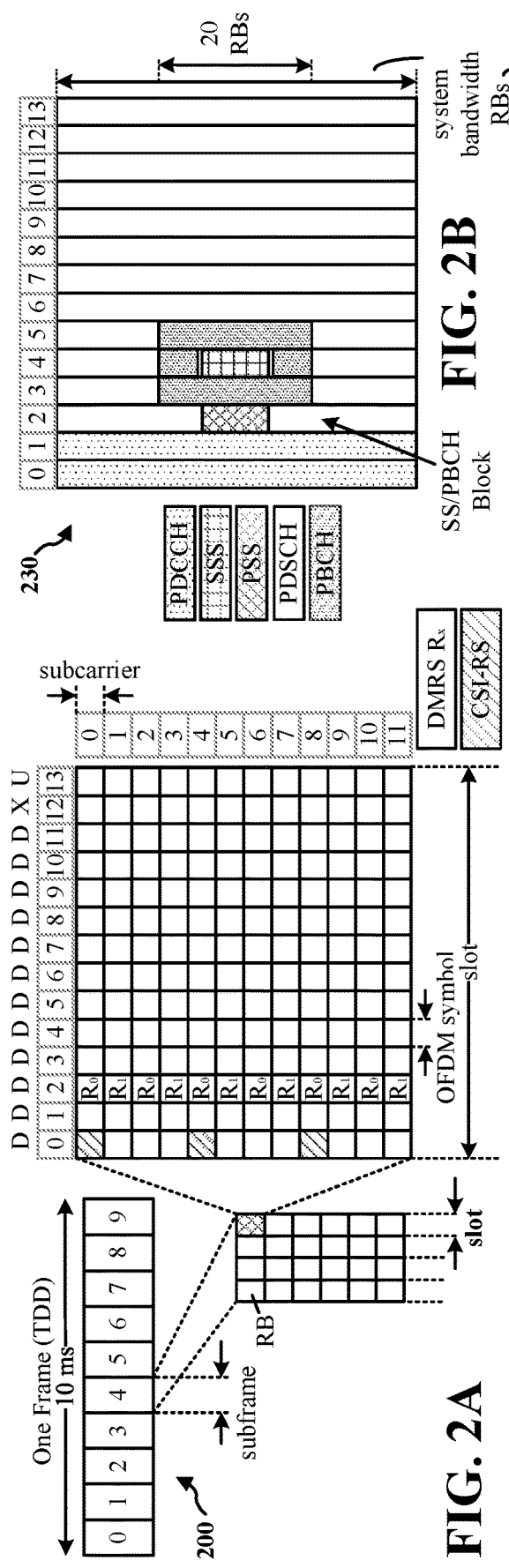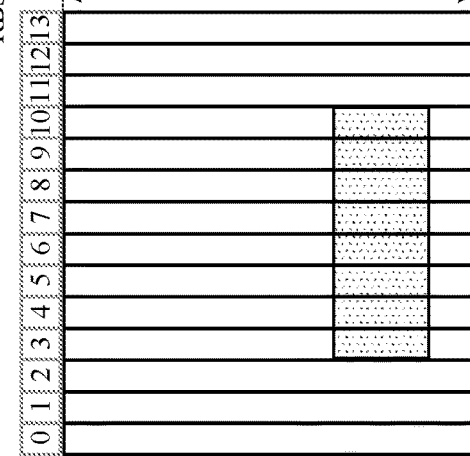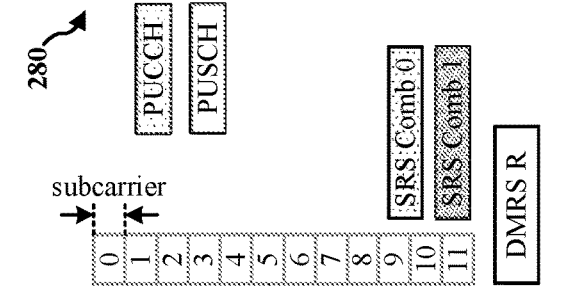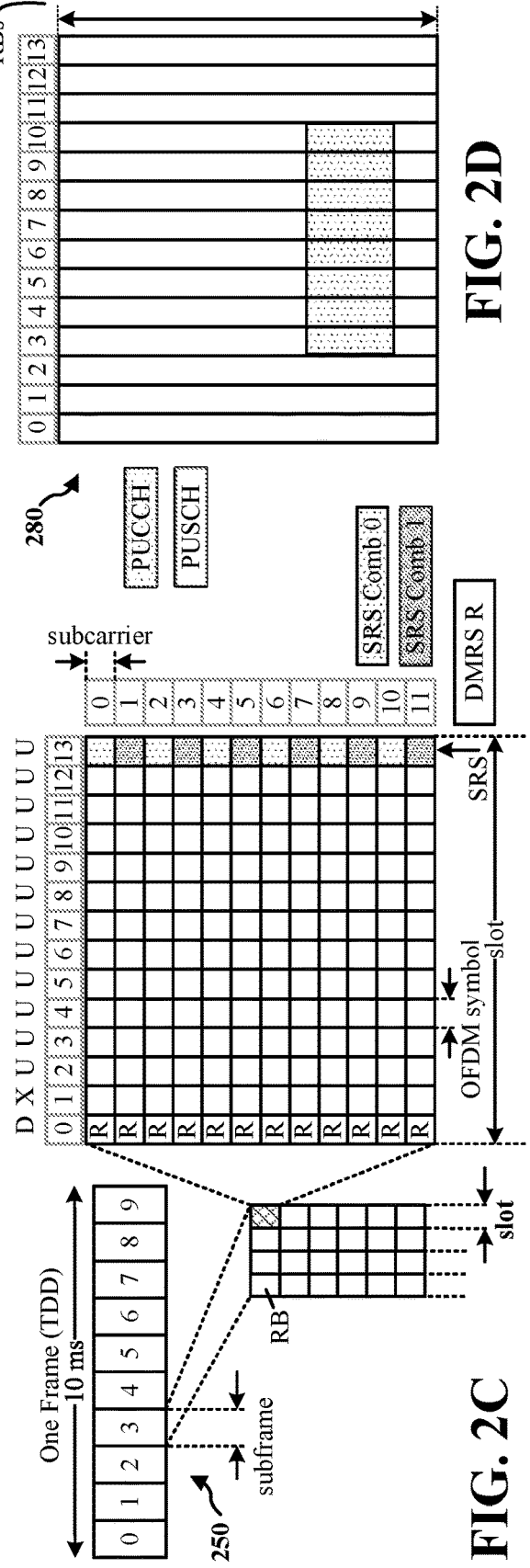

MITIGATING CLUTTER REFLECTION IN
FULL-DUPLEX MODE OPERATION

CROSS-REFERENCE TO RELATED
APPLICATION

This application claims priority to U.S. Application No. 63/077,413, entitled "MITIGATING CLUTTER REFLECTION IN FULL-DUPLEX MODE OPERATION," filed on Sep. 11, 2020, the disclosure of which is incorporated by reference herein in its entirety.

BACKGROUND

Technical Field

The present disclosure relates generally to wireless communication, and more particularly, to mitigating clutter reflection in full-duplex mode operation.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (such as with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example implementation includes a method of wireless communication at a wireless apparatus (e.g., a user equipment (UE) or a base station), comprising performing transmit operations over a channel, determining a clutter context of the wireless apparatus, comparing a sensed power level to a context threshold associated with the clutter context, the sensed power level indicating a power sensed on a channel by the wireless apparatus, and determining whether to operate on the channel in a full-duplex mode based on the comparing.

The disclosure also provides an apparatus (e.g., a UE or a base station) including a memory storing computer-executable instructions and at least one processor configured to execute the computer-executable instructions to perform the above method, an apparatus including means for performing the above method, and a non-transitory computer-readable medium storing computer-executable instructions for performing the above method.

An example implementation includes a method of wireless communication at a wireless apparatus (e.g., a UE or a base station), comprising performing transmit operations over a channel, determining a first representation corresponding to a transmit signal transmitted by the wireless apparatus over a channel, determining a second representation corresponding to a receive signal received by the wireless apparatus on the channel, determining a correlation value between the first representation and the second representation, comparing the correlation value to a threshold to determine a clutter context; and determining whether to operate on the channel in a full-duplex mode based on the clutter context.

The disclosure also provides an apparatus (e.g., a UE or a base station) including a memory storing computer-executable instructions and at least one processor configured to execute the computer-executable instructions to perform the above method, an apparatus including means for performing the above method, and a non-transitory computer-readable medium storing computer-executable instructions for performing the above method.

To the accomplishment of the foregoing and related ends, the one or more aspects include the features hereinafter fully described and particularly pointed out in the claims. The following description and the annexed drawings set forth in detail some illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first 5G/NR frame, in accordance with some aspects of the present disclosure.

FIG. 2B is a diagram illustrating an example of DL channels within a 5G/NR subframe, in accordance with some aspects of the present disclosure.

FIG. 2C is a diagram illustrating an example of a second 5G/NR frame, in accordance with some aspects of the present disclosure.

FIG. 2D is a diagram illustrating an example of UL channels within a 5G/NR subframe, in accordance with some aspects of the present disclosure.

DETAILED DESCRIPTION

Figure 1:
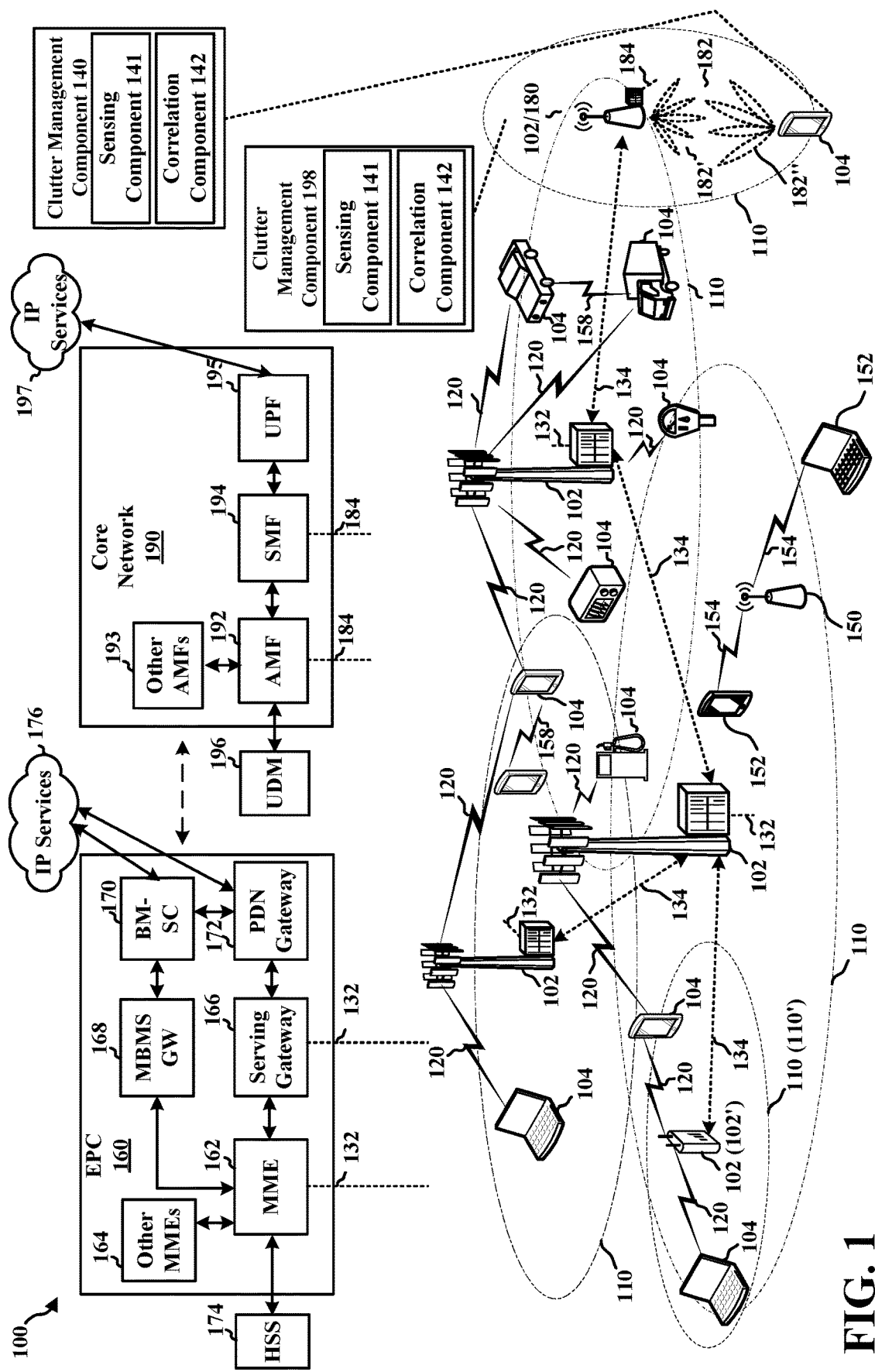
FIG. 1 is a diagram illustrating an example of a wireless communications system and an access network, in accordance with some aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to a person having ordinary skill in the art that these concepts may be practiced without these specific details. In some instances, structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, among other examples (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, among other examples, whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Various implementations relate generally to a procedure for mitigating clutter reflection in full-duplex mode operation. In some aspects, a wireless apparatus (e.g., a base station or a UE) may determine a clutter context, select a full-duplex threshold or a clutter threshold based upon the clutter context, and compare a sensed power level of a channel to the selected threshold. Further, the wireless apparatus may perform transmit and receive operations in a full-duplex mode on the same channel if the sensed power level is below the selected threshold. As used herein, in some aspects, "full-duplex mode" may refer to transmitting and receiving data at the same time and on the same frequency using a single transceiver component. In some other aspects, a wireless apparatus may determine a clutter context of a channel based on a correlation value between a transmitted signal and a received signal on the channel. Further, the wireless apparatus may perform transmit and receive operations in a full duplex mode on the channel if the correlation value is above a predefined threshold. As used herein, in some aspects, a "correlation value" may refer to the output of a correlation function configured to determine a statistical correlation between two signals as a function of delay. In some instances, the correlation function may compare segments, signatures, or other types of representations of each signal to determine the correlation value.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (for example, a 5G Core (5GC)). The base stations 102 may include macrocells (high power cellular base station) or small cells (low power cellular base station). The macrocells include base stations. The small cells include femtocells, picocells, and microcells.

In an aspect, one or more UEs 104 may include a clutter management component 140 configured to distinguish between clutter interference on a channel due to a transmission by the particular UE 104 and the channel being occupied for reception purposes. The clutter management component 140 may include a sensing component 141 configured to perform wireless sensing operations, and/or a correlation component 142 configured to determine a correlation value between data transmitted by the UE 104 and data received by the UE 104. Further, in some aspects, a base station 102 may include a clutter management component 198 configured to distinguish between clutter interference on a channel due to a transmission by the base station 102 and the channel being occupied for reception purposes. The clutter management component 198 may include a sensing component 141 configured to perform wireless sensing operations, and/or correlation component 142 configured to determine a correlation value between transmitted data and received data.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (for example, an S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (for example, handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (for example, through the EPC 160 or core network 190) with each other over third backhaul links 134 (for example, X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102a may have a coverage area 110a that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 or downlink (DL) (also referred to as forward link) transmissions from a base station 102 to a UE 104. The communication links 120 may use multiple-input and multiple-output (MIMO) antenna technology, including spatial multiplexing, beamforming, or transmit diversity. The communication links may be through one or more carriers. The base stations 102/UEs 104 may use spectrum up to Y MHz (for example, 5, 10, 15, 20, 100, 400 MHz, among other examples) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (for example, more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Some UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102a may operate in a licensed or an unlicensed frequency spectrum. When operating in an unlicensed frequency spectrum, the small cell 102a may employ NR and use the same 5 GHz unlicensed frequency spectrum as used by the Wi-Fi AP 150. The small cell 102a, employing NR in an unlicensed frequency spectrum, may boost coverage to or increase capacity of the access network.

A base station 102, whether a small cell 102a or a large cell (for example, macro base station), may include or be referred to as an eNB, gNodeB (gNB), or another type of base station. Some base stations, such as gNB 180 may operate in one or more frequency bands within the electromagnetic spectrum. The electromagnetic spectrum is often subdivided, based on frequency/wavelength, into various classes, bands, channels, etc. In 5G NR two initial operating bands have been identified as frequency range designations FR1 (416 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range. The base station 180 and the UE 104 may each include a plurality of antennas, such as antenna elements, antenna panels, or antenna arrays to facilitate the beamforming.

The base station 180 may transmit a beamformed signal to the UE 104 in one or more transmit directions 182a. The UE 104 may receive the beamformed signal from the base station 180 in one or more receive directions 182b. The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, or other IP services.

The base station may include or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (for example, MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (for example, parking meter, gas pump, toaster, vehicles, heart monitor, among other examples). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the following description may be focused on 5G NR, the concepts described herein may be applicable to other similar areas, such as LTE, LTE-A, CDMA, GSM, and other wireless technologies.

FIGS. 2A-2D include example diagrams 200, 230, 250, and 280 illustrating examples structures that may be used for wireless communication by the base station 102 and the UE 104, e.g., for 5G NR communication. FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description presented herein applies also to a 5G/NR frame structure that is TDD.

Other wireless communication technologies may have a different frame structure or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC- FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. For slot configuration 0 and numerology μ, there are 14 symbols/slot and 2∞ slots/subframe. The subcarrier spacing and symbol length/duration are a function of the numerology. The subcarrier spacing may be equal to $2^\mu * 15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more CCE, each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (SSB). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), or UCI.

Figure 3:
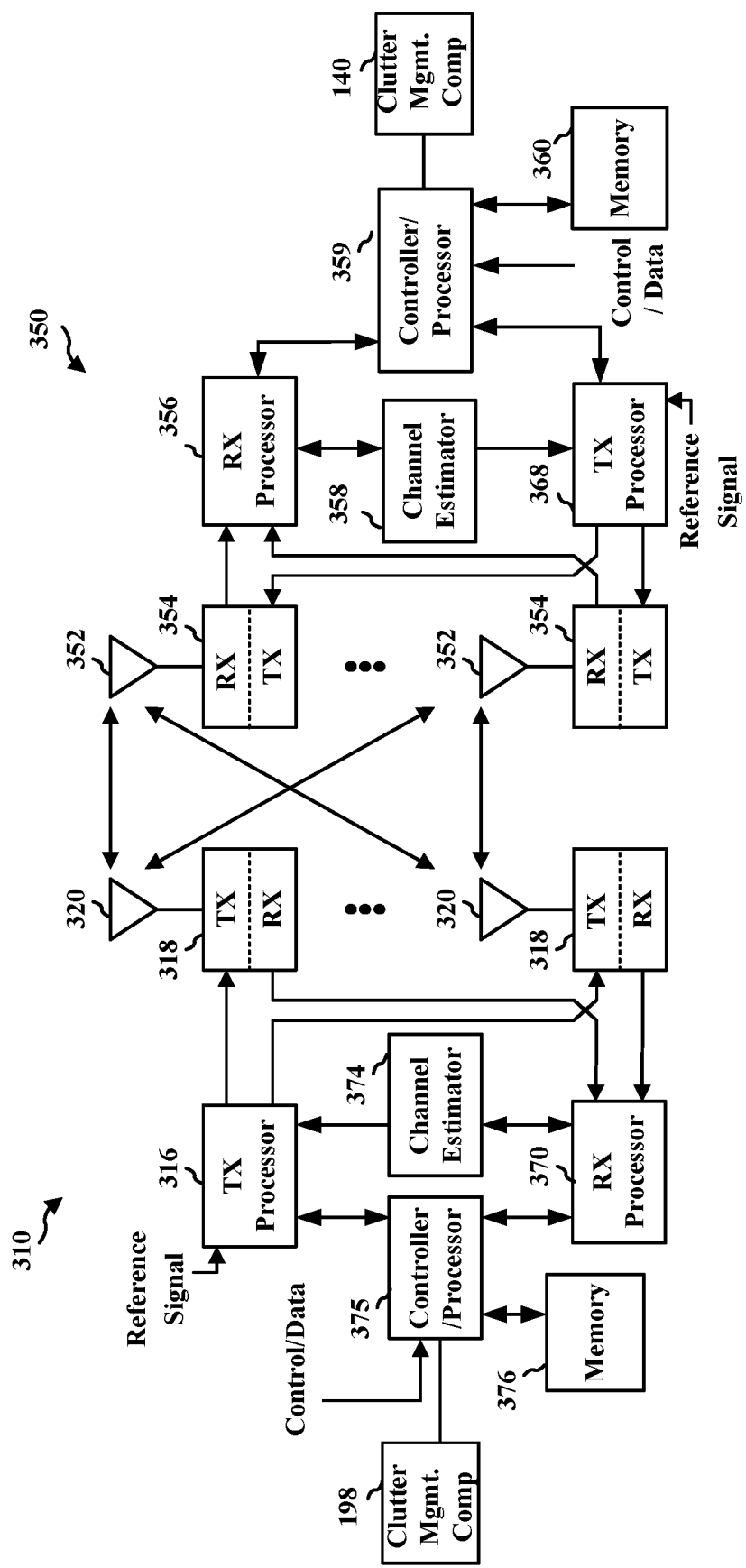
FIG. 3 is a diagram illustrating an example of a base station and a user equipment (UE) in an access network, in accordance with some aspects of the present disclosure.

FIG. 3 is a block diagram of a base station 102/180 in communication with a UE 104 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (such as MIB, SIBs), RRC connection control (such as RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (such as binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (such as a pilot) in the time or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal or channel condition feedback transmitted by the UE 104. Each spatial stream may then be provided to a different antenna 320 via a separate transmitter 318TX. Each transmitter 318TX may modulate an RF carrier with a respective spatial stream for transmission.

At the UE 104, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 104. If multiple spatial streams are destined for the UE 104, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 102/180. These soft decisions may be based on channel estimates computed by the channel estimator 358. The soft decisions are then decoded and deinterleaved to recover the data and control signals that were originally transmitted by the base station 102/180 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK or NACK protocol to support HARQ operations.

Similar to the functionality described in connection with the DL transmission by the base station 102/180, the controller/processor 359 provides RRC layer functionality associated with system information (for example, MIB, SIBS) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 102/180 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 102/180 in a manner similar to that described in connection with the receiver function at the UE 104. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 104. IP packets from the controller/processor 375 may be provided to the EPC 160. The controller/processor 375 is also responsible for error detection using an ACK or NACK protocol to support HARQ operations.

In the UE 104, at least one of the TX processor 368, the RX processor 356, and the controller/processor 359 may be configured to perform aspects in connection with the clutter management component 140 of FIG. 1.

In the base station 102/180, at least one of the TX processor 316, the RX processor 370, and the controller/processor 375 may be configured to perform aspects in connection with the clutter management component 198 of FIG. 1.

In view of the expected increase in wireless data traffic demand, wireless system designers have turned to unlicensed spectrum bands to improve the capacity of future cellular systems. For example, NR may be operated in unlicensed bands through NR-based access to unlicensed spectrum (NR-U). Often communication operations in unlicensed spectrums utilize contention management techniques to provide fair access to wireless devices and co-existence amongst different radio access technologies. In addition, for increased capacity, NR wireless apparatus may operate in a full-duplex mode where the wireless apparatus transmits and receives data at the same time and on the same frequency. However, many contention management techniques inadvertently identify the effects of transmission activity at a wireless apparatus as rendering the channel busy or occupied channel for reception activity, thereby preventing the wireless apparatus from performing reception activity on the channel in accordance with the full-duplex mode capabilities of the wireless apparatus.

The present disclosure provides techniques for mitigating clutter reflection in full-duplex mode operation. As described in detail herein, a wireless apparatus may be configured to determine a clutter context indicating the presence or absence of significant clutter interference on a channel, and permit or deny full-duplex mode operation on the channel based at least in part on the clutter context of the channel. As used herein, in some aspects, "significant clutter interference" may refer to clutter interference above a predefined threshold and/or capable of causing a communication error at a reception component of the wireless apparatus.

In some aspects, a wireless apparatus may employ power measurements to distinguish between clutter interference due to transmission activity by the wireless apparatus and the channel being occupied. For instance, the wireless apparatus may measure received power for different receive beams to detect the clutter interference at each receive beam during a beam sweeping operation, and determine a clutter context of the wireless apparatus based at least in a part on the detected clutter interference. Further, the wireless apparatus may select a threshold based on the clutter context of the wireless apparatus. If the clutter context is indicative of the absence of significant clutter interference, the wireless apparatus may select a full-duplex threshold. Otherwise, if the clutter context is indicative of the presence of clutter interference, the wireless apparatus may select a clutter threshold. Further, the wireless apparatus may compare a sensed power at the wireless apparatus to the selected threshold. If the sensed power is greater than the selected threshold, the wireless apparatus may consider the channel occupied. If the sensed power is equal to or less than the selected threshold, the wireless apparatus may consider the detected power to correspond to clutter interference, and proceed to operate in a full-duplex mode.

In some other aspects, a wireless apparatus may employ signal cross-correlation to distinguish between clutter interference due to transmission activity by the wireless apparatus and the channel being occupied. For instance, the wireless apparatus may compare a first signal transmitted by the wireless apparatus to a second signal received at the wireless apparatus to determine a correlation value. If the correlation value is greater than or equal to a threshold, the wireless apparatus may determine that the clutter context indicates the presence of clutter interference, and proceed to operate in a full-duplex mode. Otherwise, if the correlation value is less than the threshold, the wireless apparatus may determine that the clutter context indicates that the channel is occupied and employ another channel.

Accordingly, the present techniques enable wireless devices in a communication system to incorporate clutter interference management into channel sensing, thereby enabling a wireless apparatus to accurately determine whether a full-duplex mode can be employed.

Referring to FIGS. 4-10, in one non-limiting aspect, a system 400 is configured to mitigate or reduce clutter reflection in full-duplex mode operation.

Figure 4:
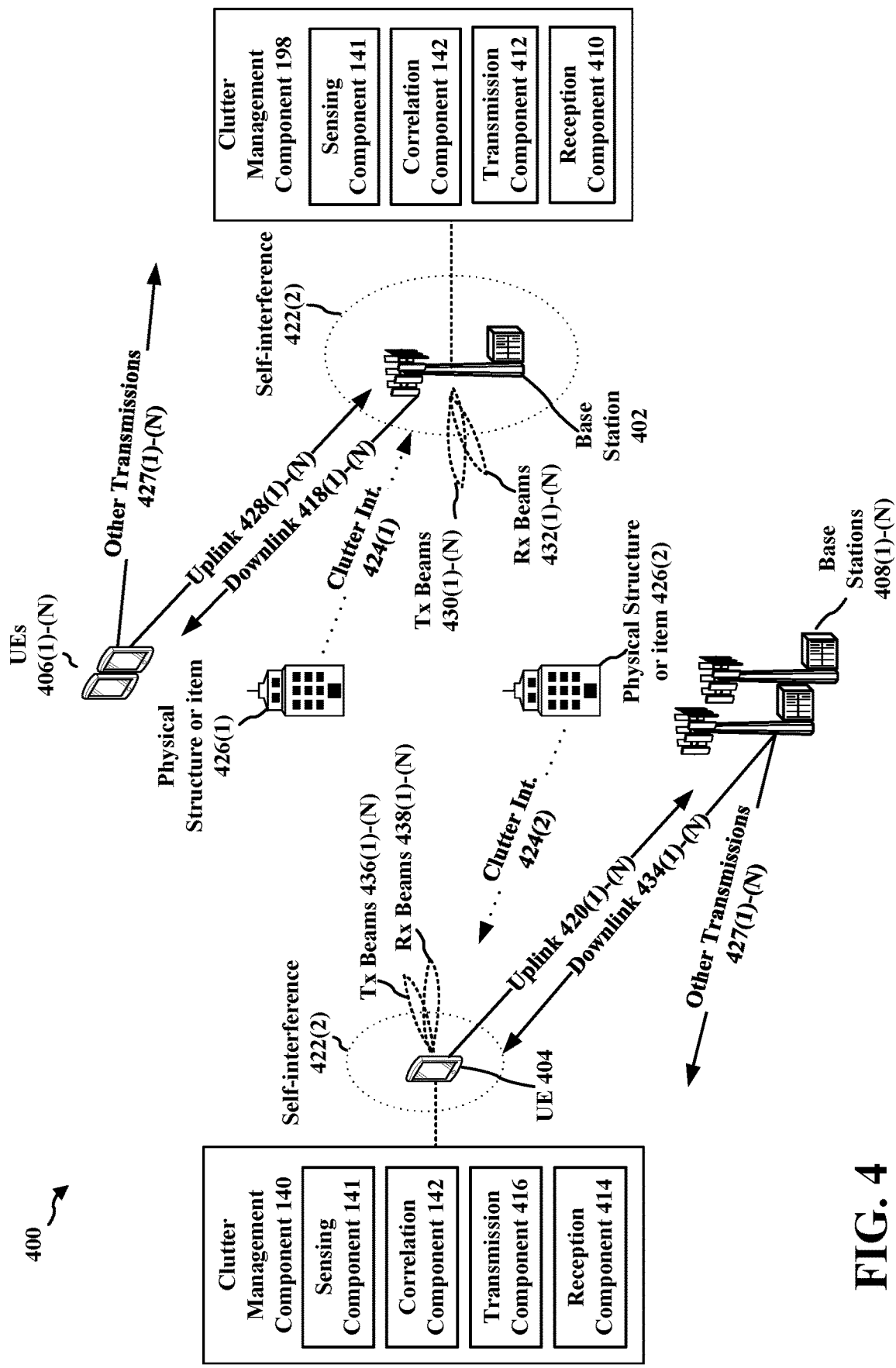
FIG. 4 is a diagram illustrating example communications and components of base stations and UEs, in accordance with some aspects of the present disclosure.

FIG. 4 is a diagram illustrating example communications and components of base stations and UEs. As illustrated in FIG. 4, the system 400 may include a base station 402, a UE 404, a plurality of base stations 406(1)-(N), and a plurality of UEs 408(1)-(N). In some aspects, the plurality of UEs 408(1)-(N) and the plurality base stations 406(1)-(N) may be located in a similar location as the UE 404 and/or the base station 402, or operating on the same network as the UE 404 and/or the base station 402. Additionally, in some aspects, the base station 402 and the plurality of base stations 406(1)-(N) may be examples of a base station 102, and the UE 404 and the plurality of UEs 408(1)-(N) may be examples of a UE 104.

The base station 402 may include the clutter management component 198. As described above with respect to FIG. 1, the clutter management component 198 may include the sensing component 141 and the correlation component 142. In addition, the base station 402 may include a reception component 410 and a transmission component 412. The transmission component 412 be configured to generate signals for transmission operations and sensing as described herein. The transmission component 412 may include, for example, an RF transmitter for transmitting the signals described herein. The reception component 410 may include, for example, a radio frequency (RF) receiver for receiving the signals described herein. In an aspect, the reception component 410 and the transmission component 412 may be co-located in a transceiver (e.g., the transceiver 810).

Further, the UE 404 may include the clutter management component 140. As described above with respect to FIG. 1, the clutter management component 140 may include the sensing component 141 and the correlation component 142. In addition, the UE 404 may include the reception component 414 and the transmission component 416. The transmission component 416 be configured to generate signals for transmission operations and sensing as described herein. The transmission component 416 may include, for example, an RF transmitter for transmitting the signals described herein. The reception component 414 may include, for example, a RF receiver for receiving the signals described herein. In an aspect, the reception component 414 and the transmission component 416 may be co-located in a transceiver (e.g., the transceiver 710).

As illustrated in FIG. 1, the base station 402 may transmit one or more downlink transmissions 418(1)-(N) to at least one of the plurality of UEs 408(1)-(N) via the transmission component 412. Further, the UE 404 may transmit one or more uplink transmissions 420(1)-(N) to at least one of the plurality of base stations 406(1)-(N) via the transmission component 416. Additionally, the downlink transmissions 418(1)-(N) may cause self-interference 422(1) at the reception component 410 of the base station 402, and the uplink transmissions 420(1)-(N) may cause self-interference 422(2) at the reception component 414 of the UE 404. It is noted that the self-interference 422 is illustrated in dashed line format to represent this interference being optional as this self-interference 422 may not occur.

In some instances, the downlink transmissions 418(1)-(N) may cause clutter interference 424(1) at the reception component 410 of base station 402 due to a physical structure or item 426(1) causing reflection of the downlink transmissions 418(1)-(N) back towards the base station 402. Similarly, the uplink transmissions 420(1)-(N) may cause clutter interference 424(2) at the reception component 414 of base station 402 due to a physical structure or item 426(2) causing reflection of the uplink transmissions 420(1)-(N) back towards the UE 404. It is noted that the clutter interference 424(1)-(2) is illustrated in dashed line format to represent this interference being optional as this interference may not occur. Further, the plurality of base stations 406(1)-(N) and the plurality of UEs 408(1)-(N) may send and receive a plurality of other transmissions 427(1)-(N).

Additionally, in some aspects, the base station 402 may endeavor to operate in a full-duplex mode employing the reception component 410 and the transmission component 412 to send and receive data contemporaneously on the same frequency. In particular, the base station 402 may endeavor to receive uplink transmissions 428(1)-(N) using the reception component 410, while transmitting the downlink transmissions 418(1)-(N) using the transmission component 412 on the same channel.

As such, in some aspects, the clutter management component 198 may select a threshold based on a clutter context of a transmit beam (Tx) 430 and a partner receive beam 432 (Rx) of the base station 402. If the clutter context is indicative of the absence of significant clutter interference when employing the transmit beam 430, the clutter management component 198 may select a full-duplex threshold that accounts for the self-interference 422(1). Otherwise, if the clutter context is indicative of the presence of the clutter interference when employing the transmit beam 430, the clutter management component 198 may select a clutter threshold that accounts for the clutter interference 424(1). Further, the clutter management component 198 may compare a sensed power at the reception component 410 or the transmission component 412 to the selected threshold. If the sensed power is greater than the selected threshold, the clutter management component 198 may consider the channel occupied. When sensed power is greater than the selected threshold, the clutter management component determines that the sensed power is greater than expected given the clutter context, i.e., the sensed power is greater than expected for the self-interference 422(1) or the clutter interference 424(1). If the sensed power is lesser than or equal to the selected threshold, the clutter management component 198 may initiate receipt of the uplink transmissions 426(1)-(N) in a full-duplex mode. Similarly, in response to UE 404 endeavoring to receive downlink transmissions 434(1)-(N) using the reception component 414, while transmitting the uplink transmissions 420(1)-(N) using the transmission component 416 on the same channel, the clutter management component 140 may perform similar steps. For example, the clutter management component 140 may determine a clutter context of a Tx beam 436 and a partner Rx beam 438, select a threshold based upon the clutter context, and determine whether to employ the full-duplex mode on the channel based upon a sensed power at the reception component 414 or transmission component 416 being less than or equal to the threshold.

In some other aspects, the clutter management component 198 may compare a first signal (e.g., the downlink transmissions 418(1)) transmitted by the transmission component 412 to a second signal (e.g., the clutter interference 424(1)) received at the reception component 410 to determine a correlation value. If the correlation value is greater than or equal to a threshold (e.g., a correlation threshold), the clutter management component 198 may determine that the clutter context indicates the presence of clutter interference, and initiate receipt of the uplink transmissions 420(1)-(N) in a full-duplex mode. Otherwise, the clutter management component 198 may determine that the clutter context indicates that the channel is occupied. Similarly, in response to the UE 404 endeavoring to receive downlink transmissions 434(1)-(N) using the reception component 414, while transmitting the uplink transmissions 420(1)-(N) using the transmission component 416 on the same channel, the clutter management component 140 may perform similar steps. For example, the clutter management component 140 may compare a first signal (e.g., the uplink transmissions 420(1)) transmitted by the transmission component 416 to a second signal (e.g., the clutter interference 424(2)) received at the reception component 414 to determine a correlation value, and determine whether to employ the full-duplex mode on the channel based upon the correlation value being greater than or equal to a threshold.

Figure 5C:
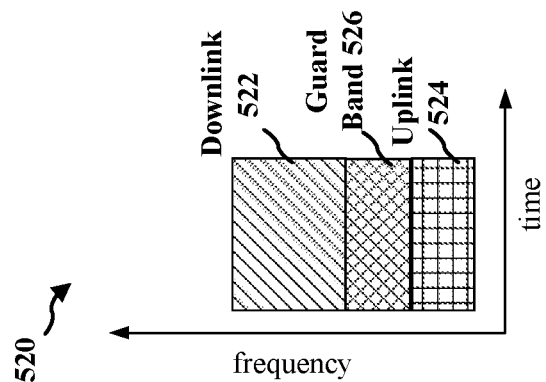
FIG. 5C is a diagram illustrating an example of sub-band full duplex, in accordance with some aspects of the present disclosure.
Figure 5B:
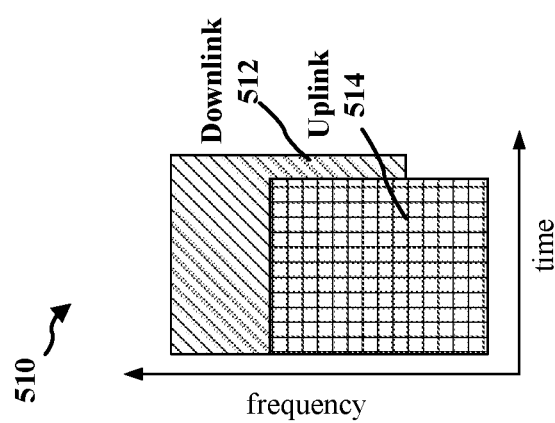
FIG. 5B is a diagram illustrating a second example of in-band full duplex, in accordance with some aspects of the present disclosure.
Figure 5A:
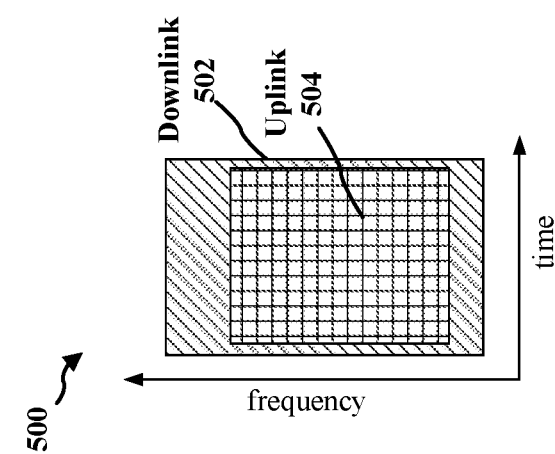
FIG. 5A is a diagram illustrating a first example of in-band full duplex, in accordance with some aspects of the present disclosure.

FIG. 5A is a diagram 500 illustrating a first example of in-band full duplex, in accordance with some aspects of the present disclosure. As illustrated in FIG. 5A, a transmit operation (e.g., the downlink transmission 502) and a receive operation (e.g., the uplink transmission 504) may occur at the same time over a common frequency band. In particular, in some aspects, there may be full overlap between the operations.

FIG. 5B is a diagram 510 illustrating a second example of in-band full duplex, in accordance with some aspects of the present disclosure. As illustrated in FIG. 5B, a transmit operation (e.g., the downlink transmission 512) and a receive operation (e.g., the uplink transmission 514) may occur at the same time over a common frequency resource in the frequency domain. In particular, in some aspects, there may be partial overlap between the operations.

FIG. 5C is a diagram 520 illustrating a second example of sub-band full duplex, in accordance with some aspects of the present disclosure. As illustrated in FIG. 5C, a transmit operation (e.g., the downlink transmission 522) and a receive operation (e.g., the uplink transmission 524) may occur at the same but on different frequency resources in the frequency domain. Further, the frequency used for the first operation and the frequency used for the second operation may be separated by a guard band 526. In addition, in some aspects, the guard band 526 may be of a size that causes partial overlap of the transmit operation and the receive operation due to leakage of the transmit operation. For example, in some aspects, the guard band may be five RBs or less.

Figure 6:
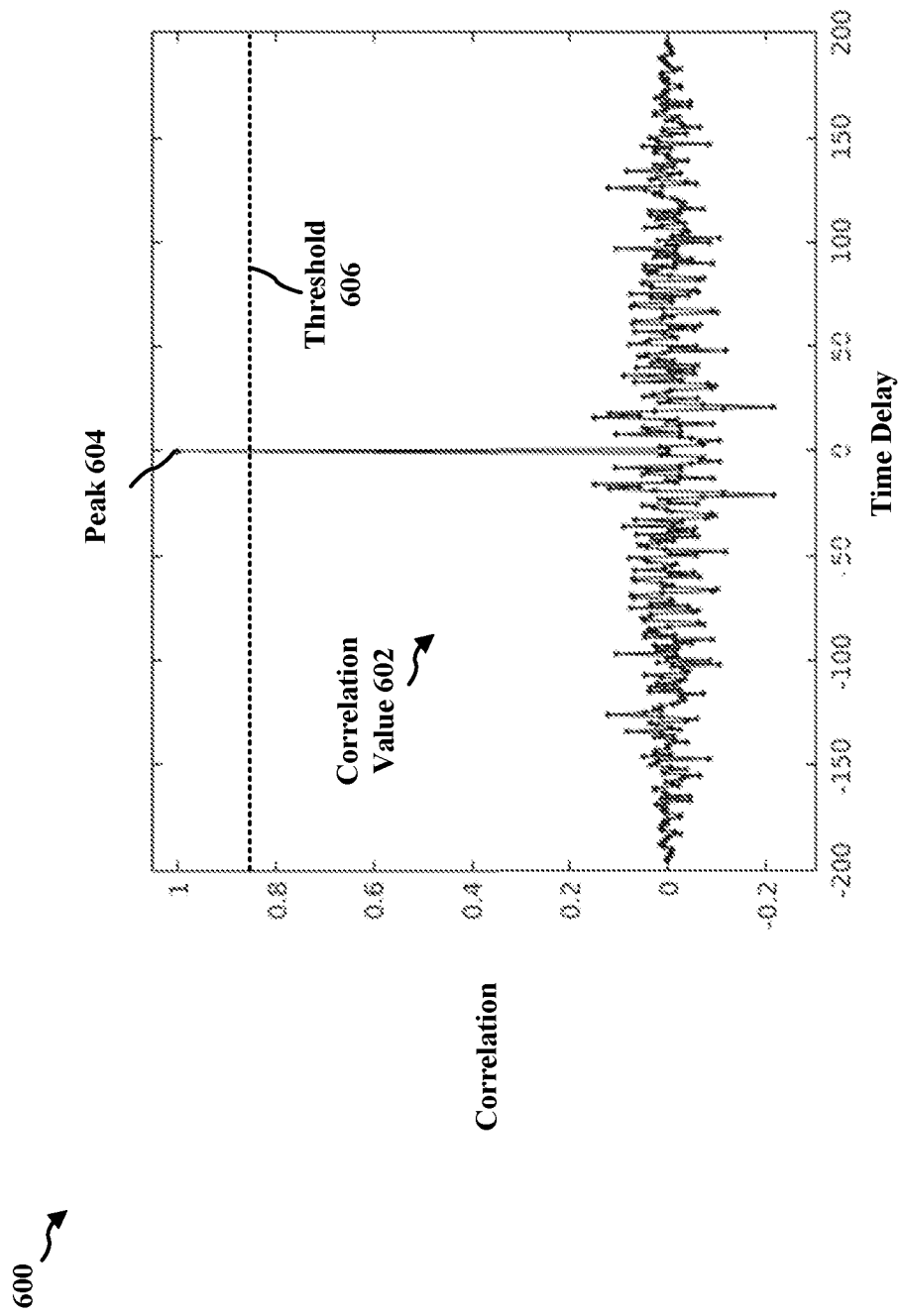
FIG. 6 is a graph diagram illustrating an example of output of a correlation function of the correlation component, in accordance with some aspects of the present disclosure.

FIG. 6 is a diagram 600 illustrating an example of a correlation value 602 of a correlation function of the correlation component, in accordance with some aspects of the present disclosure. The correlation value 602 may be an output of a cross-correlation between a first signal and a second signal, e.g., the downlink transmission 418(1) and the clutter interference 424(1), or the uplink transmission 420(1) and the clutter interference 424(2). As illustrated in FIG. 6, the correlation value 602 may have a peak 604 representing the highest value of the correlation value 602. As described in detail herein, a correlation component (e.g., the correlation component 142) may compare the peak to a threshold 606. Further, when the peak 604 is greater than or equal to the threshold 606, a clutter management component (e.g., clutter management component 140/198) may determine that the clutter context of a wireless apparatus indicates the presence of clutter interference 424, and initiate full-duplex mode operation.

Figure 7:
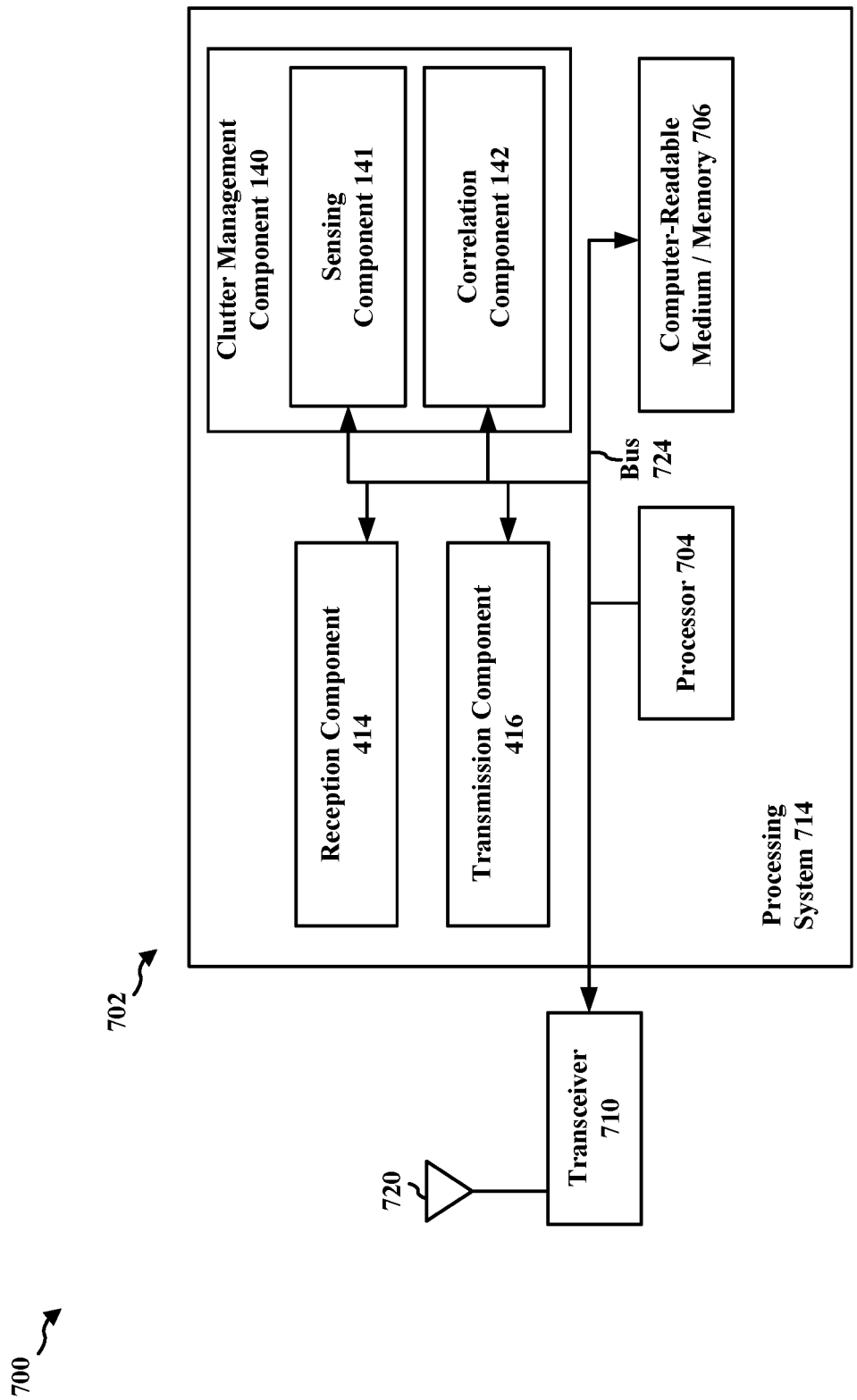
FIG. 7 is a diagram illustrating an example of a hardware implementation for a UE employing a processing system, in accordance with some aspects of the present disclosure.

FIG. 7 is a diagram 700 illustrating an example of a hardware implementation for a UE 702 employing a processing system 714. The processing system 714 may be implemented with a bus architecture, represented generally by the bus 724. The bus 724 may include any number of interconnecting buses and/or bridges depending on the specific application of the processing system 714 and the overall design constraints. The bus 724 links together various circuits including one or more processors and/or hardware components, represented by the processor 704, the clutter management component 140, the sensing component 141, the correlation component 142, and the computer-readable medium (e.g., non-transitory computer-readable medium)/memory 706. The bus 724 may also link various other circuits such as timing sources, peripherals, voltage regulators, and power management circuits, which are well known in the art, and therefore, will not be described any further.

The processing system 714 may be coupled with a transceiver 710. The transceiver 710 may be coupled with one or more antennas 720. The transceiver 710 provides a means for communicating with various other apparatus over a transmission medium. The transceiver 710 receives a signal from the one or more antennas 720, extracts information from the received signal, and provides the extracted information to the processing system 714, specifically the reception component 414. In addition, the transceiver 710 receives information from the processing system 714, specifically the transmission component 416, and based on the received information, generates a signal to be applied to the one or more antennas 720. The processing system 714 includes a processor 704 coupled with a computer-readable medium/memory 706. The processor 704 is responsible for general processing, including the execution of software stored on the computer-readable medium/memory 706. The software, when executed by the processor 704, causes the processing system 714 to perform the various functions described supra for any particular apparatus. The computer-readable medium/memory 706 may also be used for storing data that is manipulated by the processor 704 when executing software. The processing system 714 further includes at least one of the clutter management component 140, the sensing component 141, or the correlation component 142. The components may be software components running in the processor 704, resident/stored in the computer readable medium/memory 706, one or more hardware components coupled with the processor 704, or some combination thereof. The processing system 714 may be a component of the UE 350 and may include the memory 360 and/or at least one of the TX processor 368, the RX processor 356, and the controller/processor 359. Alternatively, the processing system 714 may be the entire UE (e.g., see 350 of FIG. 3).

The clutter management component 140 may be configured to determine a clutter context indicating the presence or absence of significant clutter interference on a channel, and permit or deny full-duplex mode operation on the channel based at least in part on the clutter context of the channel. The sensing component 141 may be configured to perform channel sensing activities using the transmission component 416 and the reception component 414 to distinguish between the presence of significant clutter interference on a channel due to transmission activity by the UE 702 and the channel being occupied. In some aspects, the sensing component 141 may be configured to perform a listen before talk (LBT) operation without transmission to obtain access to a channel. Once the sensing component 141 obtains access to the channel, the sensing component 141 may perform a beam sweeping operation over a plurality of beam pairs (e.g., the Tx beam 436(1) and the Rx beam 438(1), the Tx beam 436(2) and the Rx beam 438(2), and so forth) to determine a clutter context for each beam pair, i.e., the absence or presence of the clutter interference 424(2) when employing the beam pair. In some aspects, the sensing component 141 may direct the transmission component 416 to transmit signals with a pre-defined waveform and receive reflected signals corresponding to the signals via the reception component 414.

Further, before employing a Rx beam 438 in a full-duplex mode operation, the sensing component 141 may identify the relevant threshold, measure the sensed power at the relevant component, and compare the sensed power to the identified threshold. In addition, the sensing component 141 may select the relevant threshold based upon whether the sensing component 141 detected the clutter interference 424(2) when employing the partner Tx beam 436 during the beam sweeping operation. If the clutter context is indicative of the absence of significant clutter interference when employing the transmit beam 436, the sensing component 141 may select a full-duplex threshold that accounts for the self-interference 422(2). Further, the sensing component 141 may compare a power sensed at the transmission component 416 to the full-duplex threshold. Otherwise, if the clutter context is indicative of the presence of the clutter interference 424(2) when employing the transmit beam 436, the sensing component 141 may select a clutter threshold that accounts for the clutter interference 424(2). Further, the sensing component 141 may compare a power sensed at the reception component 414 to the clutter threshold. If the sensed power is less than or equal to the selected threshold, the clutter management component 140 may initiate receipt of the downlink transmissions 434(1)-(N) in a full-duplex mode. If the sensed power is greater than the selected threshold, the clutter management component 140 may decide that the full-duplex mode cannot be employed on the channel.

The correlation component 142 may be configured to perform signal correlation to distinguish between the presence of significant clutter interference on a channel due to transmission activity by the UE 702 and the channel being occupied. In particular, the correlation component 142 may perform signal processing using the signals transmitted by the transmission component 416 and the signals received by the reception component 414 to determine a correlation value, e.g., the correlation component 142 may cross-correlate the received signals to the originally-transmitted signals to determine the correlation value. In some aspects, correlating the transmitted signals and the received signals may include comparing differences in amplitude and identifying time shift information. For instance, before operating in the full-duplex mode, the sensing component 141 may compare a representation of the uplink transmissions 420(1) transmitted by the transmission component 416 to a representation of the clutter interference 424(2) received at the reception component 410 to determine a correlation value. If the correlation value is greater than or equal to a threshold, the correlation component 142 may determine that the clutter context indicates the presence of significant clutter interference, and the clutter management component 140 may initiate receipt of the downlink transmissions 434(1)-(N) in a full-duplex mode. If the correlation value is less than the threshold, the clutter management component 140 may decide that the full-duplex mode cannot be employed on the channel.

Further, in some aspects, the clutter management component 140 may perform interference nullification during receipt of the downlink transmissions 434(1)-(N) in the full-duplex mode. For instance, the clutter management component 140 may employ one or more filters to remove noise resulting from the clutter interference 424(2) from the downlink transmissions 434(1)-(N). Additionally, or alternatively, the clutter management component 140 may employ one or more interference cancellation techniques to diminish, mitigate, or reduce any effects of the clutter interference 424(2) on the processing of the downlink transmissions 434(1)-(N).

In one configuration, the UE 702 for wireless communication includes means for performing transmit operations over a channel; determining a clutter context of the wireless apparatus; comparing a sensed power level to a context threshold associated with the clutter context, the sensed power level indicating a power sensed on a channel by the wireless apparatus; and determining whether to operate on the channel in a full-duplex mode based on the comparing.

In another configuration, the UE 702 for wireless communication includes means for performing transmit operations over a channel; determining a first representation corresponding to a transmit signal transmitted by the wireless apparatus over a channel; determining a second representation corresponding to a receive signal received by the wireless apparatus on the channel; determining a correlation value between the first representation and the second representation; comparing the correlation value to a threshold to determine a clutter context; and determining whether to operate on the channel in a full-duplex mode based on the clutter context.

The aforementioned means may be one or more of the aforementioned components of the UE 702 and/or the processing system 714 of the UE 702 configured to perform the functions recited by the aforementioned means. As described supra, the processing system 714 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 8:
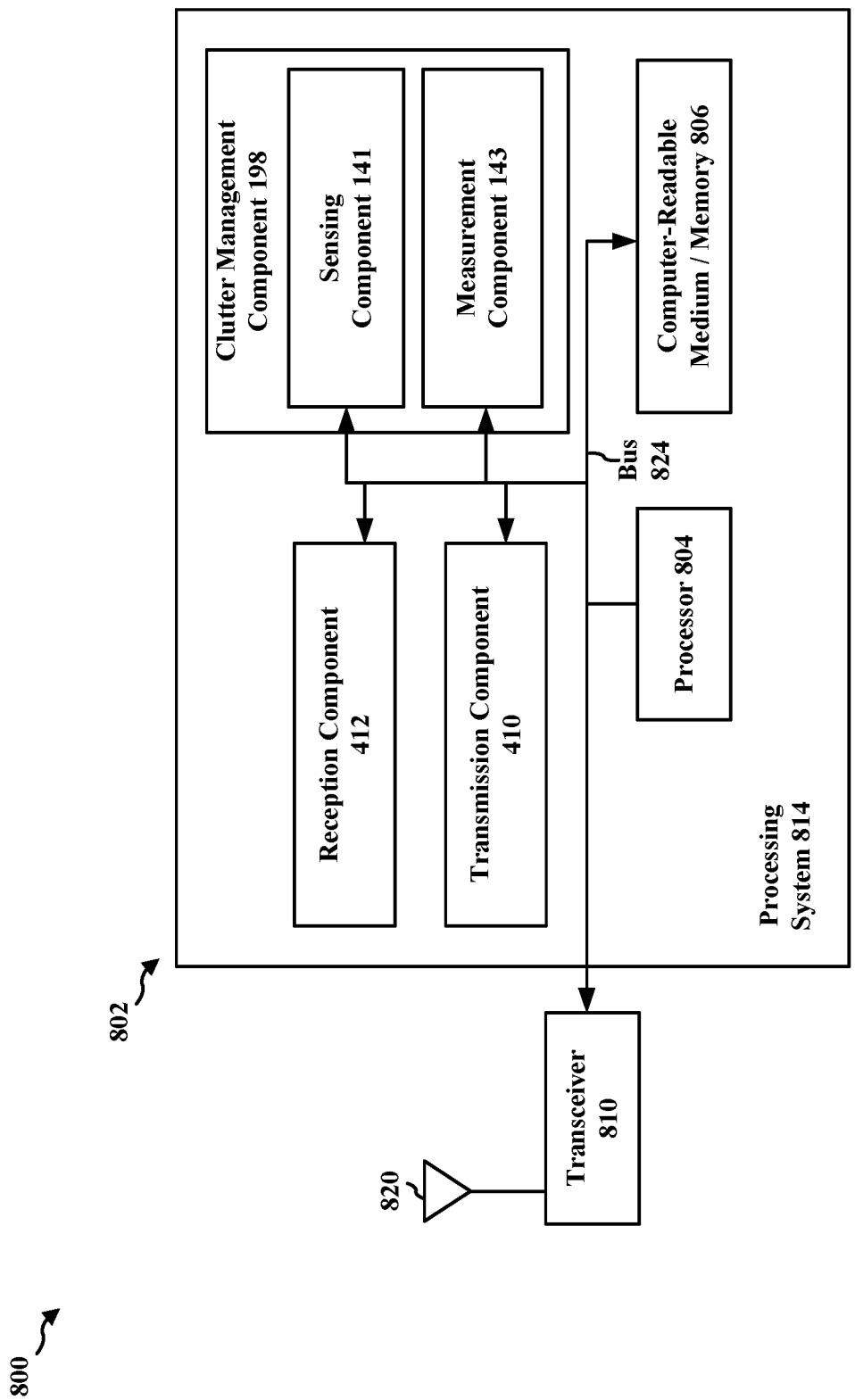
FIG. 8 is a diagram illustrating an example of a hardware implementation for a base station employing a processing system, in accordance with some aspects of the present disclosure.

FIG. 8 is a diagram 800 illustrating an example of a hardware implementation for a base station 802 employing a processing system 814. The processing system 814 may be implemented with a bus architecture, represented generally by the bus 824. The bus 824 may include any number of interconnecting buses and bridges depending on the specific application of the processing system 814 and the overall design constraints. The bus 824 links together various circuits including one or more processors and/or hardware components, represented by the processor 804, the clutter management component 198, the sensing component 141, the correlation component 142, and the computer-readable medium (e.g., non-transitory computer-readable medium)/memory 808. The bus 824 may also link various other circuits such as timing sources, peripherals, voltage regulators, and power management circuits, which are well known in the art, and therefore, will not be described any further.

The processing system 814 may be coupled with a transceiver 810. The transceiver 810 may be coupled with one or more antennas 820. The transceiver 810 provides a means for communicating with various other apparatus over a transmission medium. The transceiver 810 receives a signal from the one or more antennas 820, extracts information from the received signal, and provides the extracted information to the processing system 814, specifically the reception component 410. In addition, the transceiver 810 receives information from the processing system 814, specifically the transmission component 412, and based on the received information, generates a signal to be applied to the one or more antennas 820. The processing system 814 includes a processor 804 coupled with a computer-readable medium/memory 806. The processor 804 is responsible for general processing, including the execution of software stored on the computer-readable medium/memory 806. The software, when executed by the processor 804, causes the processing system 814 to perform the various functions described supra for any particular apparatus. The computer-readable medium/memory 806 may also be used for storing data that is manipulated by the processor 804 when executing software. The processing system 814 further includes at least one of the clutter management component 198, the sensing component 141, and the correlation component 142. The components may be software components running in the processor 804, resident/stored in the computer readable medium/memory 806, one or more hardware components coupled with the processor 804, or some combination thereof. The processing system 814 may be a component of the base station 310 and may include the memory 376 and/or at least one of the TX processor 316, the RX processor 370, and the controller/processor 375. Alternatively, the processing system 814 may be the entire base station (e.g., see 310 of FIG. 3).

The clutter management component 198 may be configured to determine a clutter context indicating the presence or absence of significant clutter interference on a channel, and permit or deny full-duplex mode operation on the channel based at least in part on the clutter context of the channel. The sensing component 141 may be configured to perform channel sensing activities using the transmission component 412 and the reception component 410 to distinguish between the presence of significant clutter interference on a channel due to transmission activity by the base station 802 and the channel being occupied. In some aspects, the sensing component 141 may be configured to perform a LBT operation without transmission to obtain access to a channel. Once the sensing component 141 obtains access to the channel, the sensing component 141 may perform a beam sweeping operation over a plurality of beam pairs (e.g., the Tx beam 430(1) and the Rx beam 432(1), the Tx beam 430(2) and the Rx beam 432(2), and so forth) to determine a clutter context for each beam pair, i.e., the absence or presence of the clutter interference 424(1) when employing the beam pair. In some aspects, the sensing component 141 may direct the transmission component 412 to transmit signals with a predefined waveform and receive reflected signals corresponding to the signals via the reception component 410.

Further, before employing a Rx beam 432 in a full-duplex mode operation, the sensing component 141 may identify the relevant threshold, measure the relevant sensed power at the relevant component, and compare the sensed power to the identified threshold. In addition, the sensing component 141 may select a relevant threshold based upon whether the sensing component 141 detected the clutter interference 424(2) for the partner Tx beam 430 during the beam sweeping operation. If the clutter context is indicative of the absence of significant clutter interference when employing the transmit beam 436, the sensing component 141 may select a full-duplex threshold that accounts for the self-interference 422(1). Further, the sensing component 141 may compare a power sensed at the transmission component 412 to the full-duplex threshold. Otherwise, if the clutter context is indicative of the presence of the clutter interference 424(1) when employing the transmit beam 430, the sensing component 141 may select a clutter threshold that accounts for the clutter interference 424(1). Further, the sensing component 141 may compare a power sensed at the reception component 410 to the clutter threshold. If the sensed power is less than or equal to the selected threshold, the clutter management component 198 may initiate receipt of the uplink transmissions 428(1)-(N) in a full-duplex mode. If the sensed power is greater than the selected threshold, the clutter management component 198 may decide that the full-duplex mode cannot be employed on the channel.

The correlation component 142 may be configured to perform signal to distinguish between the presence of significant clutter interference on a channel due to transmission activity by the base station 802 and the channel being occupied. In particular, the correlation component 142 may perform signal processing using the signals transmitted by the transmission component 412 and the signals received by the reception component 410 to determine a correlation value, e.g., the correlation component 142 may cross-correlate the received signals to the originally-transmitted signals to determine the correlation value. In some aspects, correlating the transmitted signals and the received signals may include comparing differences in amplitude and identifying time shift information. For instance, before operating in the full-duplex mode, the sensing component 141 may compare a representation of the downlink transmission 418(1) transmitted by the transmission component 412 to a representation of the clutter interference 424(1) received at the reception component 410 to determine a correlation value. If the correlation value is greater than or equal to a threshold, the correlation component 142 may determine that the clutter context indicates the presence of significant clutter interference, and the clutter management component 198 may initiate receipt of the uplink transmissions 428(1)-

(N) in a full-duplex mode. If the correlation value is less than the threshold, the clutter management component 198 may decide that the full-duplex mode cannot be employed on the channel.

Further, in some aspects, the clutter management component 198 may perform interference nullification during receipt of the uplink transmissions 428(1)-(N) in the full-duplex mode. For instance, the clutter management component 198 may employ one or more filters to remove noise resulting from the clutter interference 424(1) from the uplink transmissions 428(1)-(N). Additionally, or alternatively, the clutter management component 198 may employ one or more interference cancellation techniques to diminish, mitigate, or reduce any effects of the clutter interference 424(1) on the processing of the uplink transmissions 428(1)-(N).

In one configuration, the base station 802 for wireless communication includes means for performing transmit operations over a channel; determining a clutter context of the wireless apparatus; comparing a sensed power level to a context threshold associated with the clutter context, the sensed power level indicating a power sensed on a channel by the wireless apparatus; and determining whether to operate on the channel in a full-duplex mode based on the comparing. In another configuration, the base station 802 for wireless communication includes means for performing transmit operations over a channel; determining a first representation corresponding to a transmit signal transmitted by the wireless apparatus over a channel; determining a second representation corresponding to a receive signal received by the wireless apparatus on the channel; determining a correlation value between the first representation and the second representation; comparing the correlation value to a threshold to determine a clutter context; and determining whether to operate on the channel in a full-duplex mode based on the clutter context.

The aforementioned means may be one or more of the aforementioned components of the base station 802 and/or the processing system 814 of the base station 802 configured to perform the functions recited by the aforementioned means. As described supra, the processing system 814 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 9:
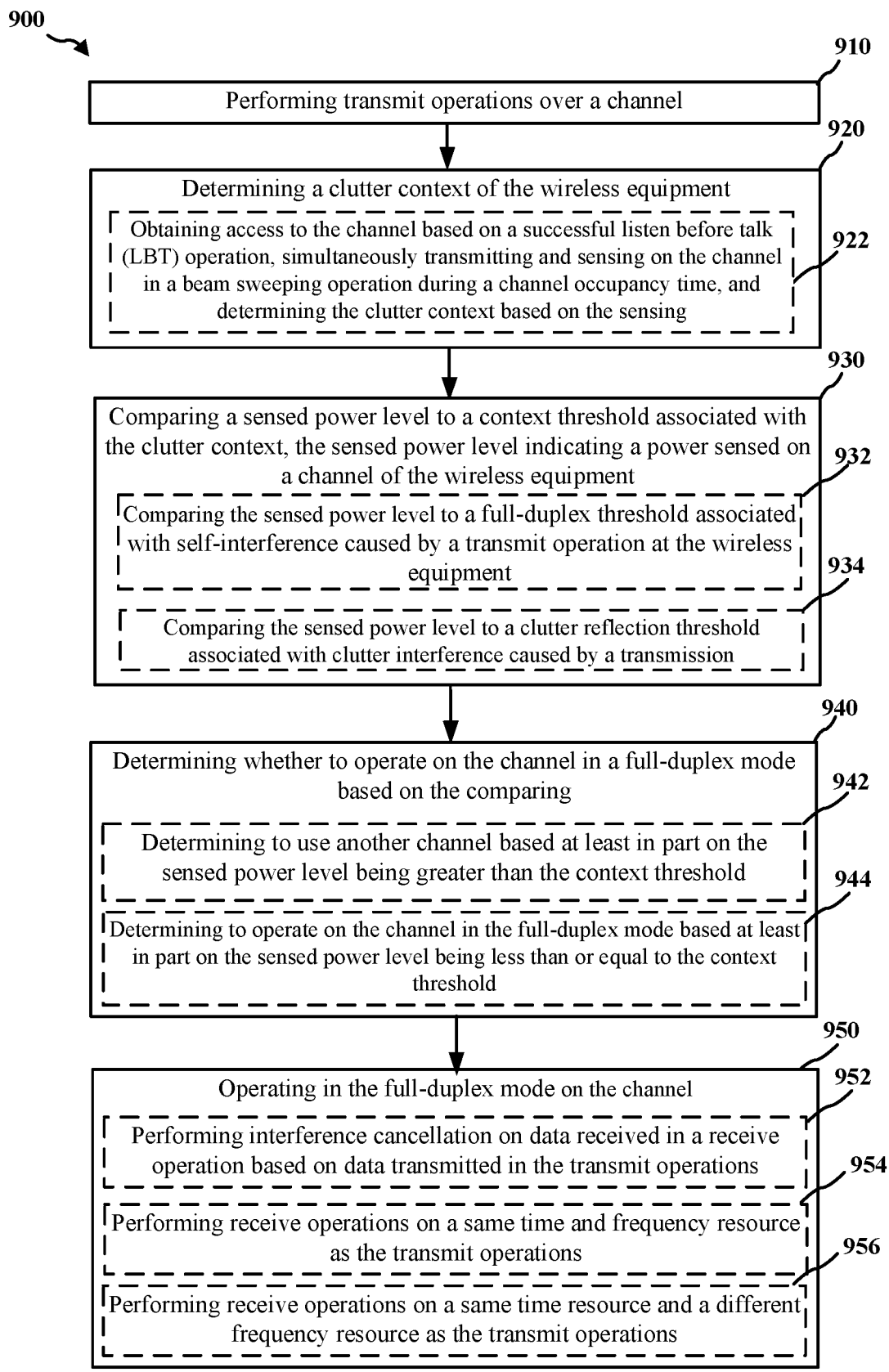
FIG. 9 is a flowchart of a first example method of mitigating clutter reflection in full-duplex mode operation, in accordance with some aspects of the present disclosure.

FIG. 9 is a flowchart of a method 900 of mitigating clutter reflection in full-duplex mode operation, in accordance with some aspects of the present disclosure. The method may be performed by a UE (e.g., the UE 104 of FIGS. 1 and 3, which may include the memory 360 and which may be the entire UE 104 or a component of the UE 104, such as the clutter management component 140, the TX processor 368, the RX processor 356, and/or the controller/processor 359; the UE 404 of FIG. 4; and/or the UE 702 of FIG. 7). The method may also be performed by a base station (e.g., the base station 102/180 of FIGS. 1 and 3, which may include the memory 376 and which may be the entire base station or a component of the base station, such as clutter management component 198, the TX processor 316, the RX processor 370, and/or the controller/processor 375; the base station 402 of FIG. 4; the base station 802 of FIG. 8).

At block 910, the method 900 includes performing transmit operations over a channel. For example, the UE 404 may transmit the uplink transmissions 420(1)-(N) to one of the base station 402, the plurality of base stations 406(1)-(N), or the plurality of UEs 408(1)-(N). As another example, the base station 402 may transmit the downlink transmissions 418(1)-(N) to one of the UE 404, the plurality of base stations 406(1)-(N), or the plurality of UEs 408(1)-(N).

Accordingly, the UE 104, the UE 404, the UE 702, the TX processor 368, the RX processor 356, and/or the controller/processor 359, executing the clutter management component 140 may provide means for performing transmit operations over a channel. Additionally, the base station 102, the base station 402, the base station 802, the TX processor 316, the RX processor 370, and/or the controller/processor 375 executing the clutter management component 198 may provide means for performing transmit operations over a channel.

At block 920, the method 900 may include determining a clutter context of the wireless apparatus. For example, the clutter management component 140 may determine whether the clutter interference 424(2) is present at the reception component 414. As another example, the clutter management component 140 may determine whether the clutter interference 424(1) is present at the reception component 410.

At sub-block 922, the block 920 may optionally include obtaining access to the channel based on a successful listen before talk (LBT) operation, simultaneously transmitting and sensing on the channel in a beam sweeping operation during a channel occupancy time, and determining the clutter context based on the sensing.

For example, the sensing component 141 may perform LBT to obtain a channel occupancy time for using the channel. During the channel occupancy time, the sensing component 141 may perform a beam sweeping operation to identify the presence or absence of significant clutter interference 424(2) for one or more beams of the UE 404. In some aspects, the beam sweeping operation may include transmitting a signal using the transmission component 416 and detecting the presence or absence of the clutter interference 424(2) at the reception component 414. Further, if the sensing component 141 detects the presence of the clutter interference 424(2), the sensing component 141 may set the clutter context for the beam to indicate the presence of the clutter interference. Conversely, if the sensing component 141 detects the absence of the clutter interference 424(2), the sensing component 141 may set the clutter context for the beam to indicate the absence of the clutter interference 424(2).

As another example, the sensing component 141 may perform LBT to obtain a channel occupancy time for using the channel. During the channel occupancy time, the sensing component 141 may perform a beam sweeping operation to identify the presence or absence of significant clutter interference 424(1) for one or more beams of the base station 402. In some aspects, the beam sweeping operation may include transmitting a signal using the transmission component 416 and detecting the presence or absence of the clutter interference 424(1) at the reception component 410. Further, if the sensing component 141 detects the presence of the clutter interference 424(1), the sensing component 141 may set the clutter context for the beam to indicate the presence of the clutter interference. Conversely, if the sensing component 141 detects the absence of the clutter interference 424(1), the sensing component 141 may set the clutter context for the beam to indicate the absence of the clutter interference 424(1).

Accordingly, the UE 104, the UE 404, the UE 702, the TX processor 368, the RX processor 356, and/or the controller/processor 359 executing the clutter management component 140 may provide means for determining a clutter context of the wireless apparatus. Further, the base station 102, the base station 402, the base station 802, the TX processor 316, the RX processor 370, and/or the controller/processor 375 executing the clutter management component 198 may provide means for determining a clutter context of the wireless apparatus.

At block 930, the method 900 may include comparing a sensed power level to a context threshold associated with the clutter context, the sensed power level indicating a power sensed on a channel by the wireless apparatus.

For example, the sensing component 141 may determine a sensed power at the reception component 414 or the transmission component 416. Further, the clutter management component 140 may determine a threshold based on the clutter context, and compare the sensed power to the threshold. As another example, the sensing component 141 may determine a sensed power at the reception component 410 or the transmission component 412. Further, the clutter management component 198 may determine a threshold based on the clutter context, and compare the sensed power to the threshold.

At sub-block 932, the block 930 may optionally include wherein the clutter context indicates an absence of clutter reflection, and comparing the sensed power level to a full-duplex threshold associated with self-interference caused by a transmit operation at the wireless apparatus. For example, if the clutter context indicates the absence of the clutter interference 424(2), the clutter management component 140 may compare the sensed power to a full-duplex threshold corresponding to the self-interference 422(2) resulting from the uplink transmissions 420(1)-(N). As another example, if the clutter context indicates the absence of the clutter interference 424(1), the clutter management component 198 may compare the sensed power to a full-duplex threshold corresponding to the self-interference 422(1) resulting from the downlink transmissions 418(1)-(N).

At sub-block 934, the block 930 may optionally include wherein the clutter context indicates an existence of clutter reflection, and comparing the sensed power level to a clutter reflection threshold associated with clutter interference caused by a transmission.

For example, if the clutter context indicates that the presence of the clutter interference 424(2), the clutter management component 140 may compare the received power to a clutter threshold corresponding to the clutter interference 424(2) resulting from interaction between the uplink transmissions 420(1)-(N) and the physical structure or item 426(1). As another example, if the clutter context indicates that the presence of the clutter interference 424(1), the clutter management component 198 may compare the received power to a clutter threshold corresponding to the clutter interference 424(1) resulting from interaction between the downlink transmissions 418(1)-(N) and the physical structure or item 426(2).

Accordingly, the UE 104, the UE 404, the UE 702, the TX processor 368, the RX processor 356, and/or the controller/processor 359 executing the clutter management component 140 may provide means for comparing a sensed power level to a context threshold associated with the clutter context, the sensed power level indicating a power sensed on a channel by the wireless apparatus. Further, the base station 102, the base station 402, the base station 802, the TX processor 316, the RX processor 370, and/or the controller/processor 375 executing the clutter management component 198 may provide means for comparing a sensed power level to a context threshold associated with the clutter context, the sensed power level indicating a power sensed on a channel by the wireless apparatus.

At block 940, the method 900 may include determining whether to operate on the channel in a full-duplex mode based on the comparing. For example, the clutter management component 140 may determine whether to receive the downlink transmissions from one of the base station 402, the plurality of base stations 406(1)-(N), or the plurality of UEs 408(1)-(N) based at least in part on comparing the sensed power to the context threshold. As another example, the clutter management component 198 may determine whether to receive the uplink transmissions from one of the UE 404, the plurality of base stations 406(1)-(N), or the plurality of UEs 408(1)-(N) based at least in part on comparing the sensed power to the context threshold.

At sub-block 942, the block 940 may optionally include determining to use another channel based at least in part on the sensed power level being greater than the context threshold. For example, the clutter management component 140 may determine to use another channel for receipt of the downlink transmissions 434(1)-(N) based at least in part on the sensed power being greater than the full-duplex threshold when the clutter context indicates the absence the clutter interference 424(2) or the clutter interference threshold when the clutter context indicates the presence of the clutter interference 424(2). As another example, the clutter management component 198 may determine to use another channel for receipt of the uplink transmissions 428(1)-(N) based at least in part on the sensed power being greater than the full-duplex threshold when the clutter context indicates the absence the clutter interference 424(1) or the clutter interference threshold when the clutter context indicates the presence of the clutter interference 424(1).

At sub-block 944, the block 940 may optionally include determining to operate on the channel in the full-duplex mode based at least in part on the sensed power level being less than or equal to the context threshold. For example, the clutter management component 140 may permit receipt of the downlink transmissions 434(1)-(N) on the same channel as the transmission of the uplink transmissions 420(1) in a full-duplex mode based at least in part on the sensed power being less than or equal to the full-duplex threshold when the clutter context indicates the absence the clutter interference 424(2) or the clutter interference threshold when the clutter context indicates the presence of the clutter interference 424(2). As another example, the clutter management component 198 may permit receipt of the uplink transmissions 428(1)-(N) on the same channel as the transmission of the downlink transmissions 418(1) in a full-duplex mode based at least in part on the sensed power being less than or equal to the full-duplex threshold when the clutter context indicates the absence the clutter interference 424(1) or the clutter interference threshold when the clutter context indicates the presence of the clutter interference 424(1).

Accordingly, the UE 104, the UE 404, the UE 702, the TX processor 368, the RX processor 356, and/or the controller/processor 359 executing the clutter management component 140 may provide means for determining whether to operate on the channel in a full-duplex mode based on the comparing. Further, the base station 102, the base station 402, the base station 802, the TX processor 316, the RX processor 370, and/or the controller/processor 375 executing the clutter management component 198 may provide means for determining whether to operate on the channel in a full-duplex mode based on the comparing.

At block 950, the method 900 may include operating in the full-duplex mode on the channel. For example, the UE 404 may receive the downlink transmissions 434(1)-(N) via the reception component 414 on the same channel as the transmission of the uplink transmissions 420(1)-(N) in a full-duplex mode. As another example, the base station 402 may receive the uplink transmissions 428(1)-(N) via the reception component 410 on the same channel as the transmission of the downlink transmissions 418(1)-(N) in a full-duplex mode.

At sub-block 952, the block 950 may optionally include performing interference cancellation on data received in a receive operation based on data transmitted in the transmit operations. For example, the clutter management component 140 may employ interference nullification or cancellation based on signal information corresponding to the uplink transmissions 420(1)-(N). In some aspects, the clutter management component 140 may filter the clutter interference 424(2) from the downlink transmissions 434(1)-(N) using the uplink transmissions 420(1)-(N). As another example, the clutter management component 198 may employ interference nullification or cancellation based on signal information corresponding to the downlink transmissions 418(1)-(N). In some aspects, the clutter management component 198 may filter the clutter interference 424(1) from the uplink transmissions 428(1)-(N) using the downlink transmissions 418(1)-(N).

At sub-block 954, the block 950 may optionally include performing receive operations on a same time and frequency resource as the transmit operations. For example, in some aspects, the UE 404 may receive the downlink transmission 434(2) via the reception component 414 on the same channel as the transmission of the uplink transmission 420(2) in an in-band full-duplex mode as described with respect to FIGS. 5A-5B. As another example, in some aspects, the base station 402 may receive the uplink transmission 428(2) via the reception component 410 on the same channel as the transmission of the downlink transmission 418(2) in an in-band full-duplex mode as described with respect to FIGS. 5A-5B.

At sub-block 956, the block 950 may optionally include performing receive operations on a same time resource and a different frequency resource as the transmit operations. For example, in some aspects, the UE 404 may receive the downlink transmissions 434(1)-(N) via the reception component 414 on the same channel as the transmission of the uplink transmission 420(1) in a sub-band full-duplex mode as described with respect to FIG. 5C. As another example, in some aspects, the base station 402 may receive the uplink transmission 428(2) via the reception component 410 on the same channel as the transmission of the downlink transmission 418(2) in a sub-band full-duplex mode as described with respect to FIG. 5C.

Accordingly, the UE 104, the UE 404, the UE 702, the TX processor 368, the RX processor 356, and/or the controller/processor 359 executing the clutter management component 140 may provide means for operating in the full-duplex mode on the channel. Further, the base station 102, the base station 402, the base station 802, the TX processor 316, the RX processor 370, and/or the controller/processor 375 executing the clutter management component 198 may provide means for operating in the full-duplex mode on the channel.

Figure 10:
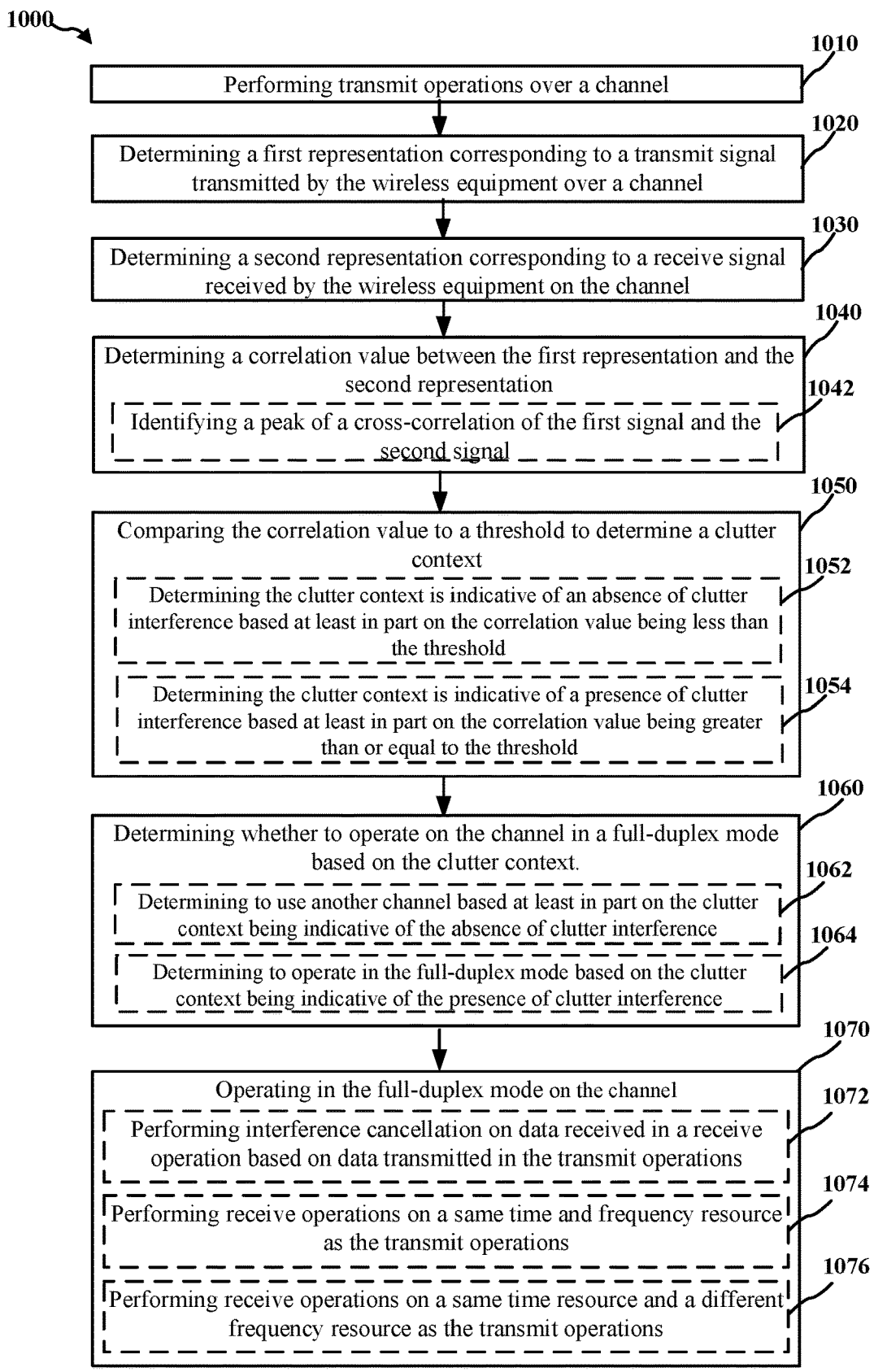
FIG. 10 is a flowchart of a second example method of mitigating clutter reflection in full-duplex mode operation, in accordance with some aspects of the present disclosure.

FIG. 10 is a flowchart of a method 1000 of mitigating clutter reflection in full-duplex mode operation, in accordance with some aspects of the present disclosure. The method may be performed by a UE (e.g., the UE 104 of FIGS. 1 and 3, which may include the memory 360 and which may be the entire UE 104 or a component of the UE 104, such as the clutter management component 140, the TX processor 368, the RX processor 356, and/or the controller/processor 359; the UE 404 of FIG. 4; and/or the UE 702 of FIG. 7). The method may also be performed by a base station (e.g., the base station 102/180 of FIGS. 1 and 3, which may include the memory 376 and which may be the entire base station or a component of the base station, such as clutter management component 198, the TX processor 316, the RX processor 370, and/or the controller/processor 375; the base station 402 of FIG. 4; the base station 802 of FIG. 8).

At block 1010, the method 1000 performing transmit operations over a channel. For example, the UE 404 may transmit the uplink transmissions 420(1)-(N) to one of the base station 402, the plurality of base stations 406(1)-(N), or the plurality of UEs 408(1)-(N). As another example, the base station 402 may transmit the downlink transmissions 418(1)-(N) to one of the UE 404, the plurality of base stations 406(1)-(N), or the plurality of UEs 408(1)-(N).

Accordingly, the UE 104, the UE 404, the UE 702, the TX processor 368, the RX processor 356, and/or the controller/processor 359, executing the clutter management component 140 may provide means for performing transmit operations over a channel. Further, the base station 102, the base station 402, the base station 802, the TX processor 316, the RX processor 370, and/or the controller/processor 375 executing the clutter management component 198 may provide means for performing transmit operations over a channel.

At block 1020, the method 1000 may include determining a first representation corresponding to a transmit signal transmitted by the wireless apparatus over a channel. For example, the correlation component 142 may determine a signal representation of the uplink transmission 420(1). As another example, the correlation component 142 may determine a signal representation of the downlink transmission 418(1).

Accordingly, the UE 104, the UE 404, the UE 702, the TX processor 368, the RX processor 356, and/or the controller/processor 359, executing the correlation component 142 may provide means for determining a first representation corresponding to a transmit signal transmitted by the wireless apparatus over a channel. Further, the base station 102, the base station 402, the base station 802, the TX processor 316, the RX processor 370, and/or the controller/processor 375 executing the correlation component 142 may provide means for determining a first representation corresponding to a transmit signal transmitted by the wireless apparatus over a channel.

At block 1030, the method 1000 may include determining a second representation corresponding to a receive signal received by the wireless apparatus on the channel. For example, the correlation component 142 may determine a signal representation of the clutter interference 124(2). As another example, the correlation component 142 may determine a signal representation of the clutter interference 124(1).

Accordingly, the UE 104, the UE 404, the UE 702, the TX processor 368, the RX processor 356, and/or the controller/processor 359, executing the correlation component 142 may provide means for determining a second representation corresponding to a receive signal received by the wireless apparatus on the channel. Further, the base station 102, the base station 402, the base station 802, the TX processor 316, the RX processor 370, and/or the controller/processor 375 executing the correlation component 142 may provide means for determining a second representation corresponding to a receive signal received by the wireless apparatus on the channel.

At block 1040, the method 1000 may include determining a correlation value between the first representation and the second representation. For example, the correlation component may input the first representation corresponding to the uplink transmission 420(1) and the second representation corresponding to the clutter interference 424(2) into a cross-correlation function to determine a correlation value. As another example, the correlation component may input the first representation corresponding to the downlink transmission 418(1) and the second representation corresponding to the clutter interference 424(1) into a cross-correlation function to determine a correlation value.

At sub-block 1042, the block 1040 may optionally include identifying a peak of a cross-correlation of the first signal and the second signal. For example, the correlation component 142 may identify the peak 604 in the correlation value 602, as described with respect to FIG. 6.

Accordingly, the UE 104, the UE 404, the UE 702, the TX processor 368, the RX processor 356, and/or the controller/processor 359, executing the correlation component 142 may provide means for performing determining a correlation value between the first representation and the second representation. Further, the base station 102, the base station 402, the base station 802, the TX processor 316, the RX processor 370, and/or the controller/processor 375 executing the correlation component 142 may provide means for determining a correlation value between the first representation and the second representation.

At block 1050, the method 1000 may include comparing the correlation value to a threshold to determine a clutter context. For example, the correlation component 142 may compare the correlation value determined from the cross-correlation function to a threshold to determine the presence or absence of the clutter interference 124(2). As another example, the correlation component 142 may compare the correlation value determined from the cross-correlation function to a threshold to determine the presence or absence of the clutter interference 124(1).

At sub-block 1052, the block 1050 may optionally include determining the clutter context is indicative of an absence of significant clutter interference based at least in part on the correlation value being less than the threshold. For example, if the correlation value is less than the threshold, the correlation component 142 may determine that the data received at the reception component corresponds to at least one of the plurality of other transmissions 427(1)-(N).

At sub-block 1054, the block 1050 may optionally include determining the clutter context is indicative of a presence of clutter interference based at least in part on the correlation value being greater than the threshold. For example, if the correlation value is greater than or equal to the threshold, the correlation component 142 may determine that the data received at the reception component corresponds to the clutter interference 124(2) caused by the uplink transmissions 420(1)-(N). As another example, if the correlation value is greater than or equal to the threshold, the correlation component 142 may determine that the data received at the reception component corresponds to the clutter interference 124(1) caused by the downlink transmissions 418(1)-(N).

Accordingly, the UE 104, the UE 404, the UE 702, the TX processor 368, the RX processor 356, and/or the controller/processor 359, executing the correlation component 142 may provide means for comparing the correlation value to a threshold to determine a clutter context. Further, the base station 102, the base station 402, the base station 802, the TX processor 316, the RX processor 370, and/or the controller/processor 375 executing the correlation component 142 may provide means for comparing the correlation value to a threshold to determine a clutter context.

At block 1060, the method 1000 may include determining whether to operate on the channel in a full-duplex mode based on the clutter context. For example, the UE 404 may decide to receive the downlink transmissions 434(1)-(N) via the reception component 414 on the same channel as the transmission of the uplink transmission 420(1) in a full-duplex mode. As another example, the base station 402 may decide to receive the uplink transmissions 428(1)-(N) via the reception component 410 on the same channel as the transmission of the downlink transmission 418(1) in a full-duplex mode.

At sub-block 1062, the block 1050 may optionally include determining to use another channel based at least in part on the clutter context being indicative of the absence of significant clutter interference. For example, the clutter management component 140 may decide to use another channel for receipt of the downlink transmissions 434(1)-(N) based at least in part on clutter context indicating the absence of significant interference due to the clutter interference 424(2) or at least one of the plurality of other transmissions 427(1)-(N) having a greater contribution to received power or interference at the reception component 414. As another example, the clutter management component 198 may decide to use another channel for receipt of the uplink transmissions 428(1)-(N) based at least in part on clutter context indicating the absence of significant interference due to the clutter interference 424(1) or at least one of the plurality of other transmissions 427(1)-(N) having a greater contribution to received power or interference at the reception component 410.

At sub-block 1064, the block 1050 may optionally include determining to operate in the full-duplex mode based on the clutter context being indicative of the presence of clutter interference. For example, the clutter management component 140 may permit receipt of the downlink transmissions 434(1)-(N) on the same channel as the transmission of the uplink transmissions 420(2) in a full-duplex mode based at least in part on the clutter context indicating the presence of significant clutter interference at the at the reception component 414. As another example, the clutter management component 198 may permit receipt of the uplink transmissions 428(1)-(N) on the same channel as the transmission of the downlink transmissions 418(1)-(N) in a full-duplex mode based at least in part on the clutter context indicating the presence of significant clutter interference at the at the reception component 410.

Accordingly, the UE 104, the UE 404, the UE 702, the TX processor 368, the RX processor 356, and/or the controller/processor 359, executing the clutter management component 140 may provide means for determining whether to operate on the channel in a full-duplex mode based on the clutter context. Further, the base station 102, the base station 402, the base station 802, the TX processor 316, the RX processor 370, and/or the controller/processor 375 executing the clutter management component 198 may provide means for determining whether to operate on the channel in a full-duplex mode based on the clutter context.

At block 1070, the method 1000 may include operating in the full-duplex mode on the channel. For example, the UE 404 may receive the downlink transmissions 434(1)-(N) via the reception component 414 on the same channel as the transmission of the uplink transmissions 420(1)-(N) in a full-duplex mode. As another example, the base station 402 may receive the uplink transmissions 428(1)-(N) via the reception component 410 on the same channel as the transmission of the downlink transmissions 418(1)-(N) in a full-duplex mode.

At sub-block 1072, the block 1070 may optionally include performing interference cancellation on data received in a receive operation based on data transmitted in the transmit operations. For example, the clutter management component 140 may employ interference nullification or cancellation based on signal information corresponding to the uplink transmissions 420(1)-(N). In some aspects, the clutter management component 140 may filter the clutter interference 424(2) from the downlink transmissions 434(1)-(N) using the uplink transmissions 420(1)-(N).). As another example, the clutter management component 198 may employ interference nullification or cancellation based on signal information corresponding to the downlink transmissions 418(1)-(N). In some aspects, the clutter management component 198 may filter the clutter interference 424(1) from the uplink transmissions 428(1)-(N) using the downlink transmissions 418(1)-(N).

At sub-block 1074, the block 1070 may optionally include performing receive operations on a same time and frequency resource as the transmit operations. For example, in some aspects, the UE 404 may receive the downlink transmissions 434(2) via the reception component 414 on the same channel as the transmission of the uplink transmissions 420(2) in an in-band full-duplex mode as described with respect to FIGS. 5A-5B. As another example, in some aspects, the base station 402 may receive the uplink transmission 428(2) via the reception component 410 on the same channel as the transmission of the downlink transmission 418(2) in an in-band full-duplex mode as described with respect to FIGS. 5A-5B.

At sub-block 1076, the block 1070 may optionally include performing receive operations on a same time resource and a different frequency resource as the transmit operations. For example, in some aspects, the UE 404 may receive the downlink transmissions 434(1)-(N) via the reception component 414 on the same channel as the transmission of the uplink transmissions 420(2) in a sub-band full-duplex mode as described with respect to FIG. 5C. As another example, in some aspects, the base station 402 may receive the uplink transmission 428(2) via the reception component 410 on the same channel as the transmission of the downlink transmission 418(2) in a sub-band full-duplex mode as described with respect to FIG. 5C.

Accordingly, the UE 104, the UE 404, the UE 702, the TX processor 368, the RX processor 356, and/or the controller/processor 359, executing the clutter management component 140 may provide means for performing receive operations on a same time and frequency resource as the transmit operations. Further, the base station 102, the base station 402, the base station 802, the TX processor 316, the RX processor 370, and/or the controller/processor 375 executing the clutter management component 198 may provide means for performing receive operations on a same time and frequency resource as the transmit operations.

The specific order or hierarchy of blocks in the processes/flowcharts disclosed is an illustration of example approaches. Based upon design preferences, the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person having ordinary skill in the art to practice the various aspects described herein. Various modifications to these aspects will be readily apparent to a person having ordinary skill in the art, and the generic principles defined herein may be applied to other aspects. The claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to a person having ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

Example Clauses

A. A method of wireless communication at a wireless apparatus, the method comprising: performing transmit operations over a channel, determining a clutter context of the wireless apparatus, comparing a sensed power level to a context threshold associated with the clutter context, the sensed power level indicating a power sensed on the channel by the wireless apparatus, and determining whether to operate on the channel in a full-duplex mode based on the comparing.

B. The method as paragraph A recites, wherein determining the clutter context of the wireless apparatus comprises: obtaining access to the channel based on a successful listen before talk (LBT) operation, simultaneously transmitting and sensing on the channel in a beam sweeping operation during a channel occupancy time, and determining the clutter context based on the sensing.

C. The method as any of paragraphs A-B recite, wherein the clutter context indicates an absence of significant clutter reflection, and comparing the sensed power level to the context threshold associated with the clutter context comprises: comparing the sensed power level to a full-duplex threshold associated with self-interference caused by a transmit operation at the wireless apparatus.

D. The method as any of paragraphs A-B recite, wherein the clutter context indicates an existence of clutter reflection, and comparing the sensed power level to the context threshold associated with the clutter context comprises: comparing the sensed power level to a clutter reflection threshold associated with clutter interference caused by a transmission.

E. The method as any of paragraphs A-D recite, wherein determining whether to operate on the channel in the full-duplex mode comprises determining to use another channel based at least in part on the sensed power level being greater than the context threshold.

F. The method as paragraph A-D recites, wherein determining whether to operate on the channel in the full-duplex mode comprises determining to operate on the channel in the full-duplex mode based at least in part on the sensed power level being less than or equal to the context threshold.

G. The method as paragraph A-F recites, further comprising operating in the full-duplex mode on the channel, and performing interference cancellation on data received in a receive operation based on data transmitted in the transmit operations H. The method as paragraph A-F recites, further comprising operating in the full-duplex mode on the channel, the operating including performing receive operations on a same time and frequency resource as the transmit operations.

I. The method as paragraph A-F recites, further comprising operating in the full-duplex mode on the channel, the operating including performing receive operations on a same time resource and a different frequency resource as the transmit operations.

J. The method as paragraph A-F recites, wherein the wireless apparatus is a 5G NR base station (gNode B) operating in unlicensed spectrum or a user equipment communicatively coupled with a gNodeB.

K. An apparatus for wireless communication, comprising a memory storing computer-executable instructions; and at least one processor coupled with the memory and configured to execute the computer-executable instructions to perform the method of any of paragraphs A-J.

L. An apparatus for wireless communication, comprising means for performing the method of any of paragraphs A-J.

M. A non-transitory computer-readable medium storing computer executable code, the code when executed by a processor causes the processor to perform the method of any of paragraphs A-J.

N. A method of wireless communication at a wireless apparatus, the method comprising: performing transmit operations over a channel, determining a first representation corresponding to a transmit signal transmitted by the wireless apparatus over the channel, determining a second representation corresponding to a receive signal received by the wireless apparatus on the channel, determining a correlation value between the first representation and the second representation; comparing the correlation value to a threshold to determine a clutter context, and determining whether to operate on the channel in a full-duplex mode based on the clutter context.

O. The method as paragraph N recites, wherein the first representation is a first signal, the second representation is a second signal, and determining the correlation value comprises identifying a peak of a cross-correlation of the first signal and the second signal.

P. The method as any of paragraphs N-O recite, wherein comparing the correlation value to the threshold comprises determining the clutter context is indicative of an absence of significant clutter interference based at least in part on the correlation value being less than the threshold.

Q. The method as paragraph P recites, wherein determining whether to operate on the channel in the full-duplex mode comprises determining to use another channel based at least in part on the clutter context being indicative of the absence of significant clutter interference.

R. The method as any of paragraphs N-O recite, wherein comparing the correlation value to the threshold comprises determining the clutter context is indicative of a presence of clutter interference based at least in part on the correlation value being greater than the threshold.

S. The method as paragraph R recites, wherein determining whether to operate on the channel comprises determining to operate in the full-duplex mode based on the clutter context being indicative of the presence of clutter interference, and further comprising: operating in the full-duplex mode on the channel, and performing interference cancellation on data received in a receive operation based on data transmitted in a transmit operation at the wireless apparatus.

T. The method as any of paragraphs N-S recite, further comprising operating in the full-duplex mode on the channel, the operating including performing receive operations on a same time and frequency resource as the transmit operations.

U. The method as any of paragraphs N-S recite, further comprising operating in the full-duplex mode on the channel, the operating including performing receive operations on a same time resource and a different frequency resource as the transmit operations.

V. The method as any of paragraphs N-R and T-U recite, wherein determining whether to operate on the channel in the full-duplex mode comprises: sensing a power level of the channel, and determining whether to use the channel for the receive operation in the full-duplex mode based on the clutter context and the power level.

W. The method as any of paragraphs N-W recite, wherein the wireless apparatus is a 5G NR base station (gNode B) operating in unlicensed spectrum, or the wireless apparatus is a user equipment communicatively coupled with a 5G-NR base station (gNodeB).

X. An apparatus for wireless communication, comprising a memory storing computer-executable instructions; and at least one processor coupled with the memory and configured to execute the computer-executable instructions to perform the method of any of paragraphs N-W.

Y. An apparatus for wireless communication, comprising means for performing the method of any of paragraphs N-W.

Z. A non-transitory computer-readable medium storing computer executable code, the code when executed by a processor causes the processor to perform the method of any of paragraphs N-W.

What is claimed is:

1. An apparatus for wireless communication, comprising:
memory including computer-executable instructions; and
at least one processor coupled with the memory and configured to execute the computer-executable instructions to:
perform transmit operations over a channel;
determine a clutter context of the apparatus;

compare a sensed power level to a context threshold associated with the clutter context, the sensed power level indicating a power sensed on the channel by the apparatus; and determine whether to operate on the channel in a full-duplex mode based on the comparing, wherein to determine whether to operate on the channel in the full-duplex mode, the at least one processor is configured to:

determine to operate on the channel in the full-duplex mode based at least in part on the sensed power level being less than or equal to the context threshold.

2. The apparatus of claim 1, wherein to determine the clutter context of the apparatus, the at least one processor is configured to:

obtain access to the channel based on a successful listen before talk (LBT) operation;

simultaneously transmit and sense on the channel in a beam sweeping operation during a channel occupancy time; and determine the clutter context based on the sensing.

3. The apparatus of claim 1, wherein the clutter context indicates an absence of significant clutter reflection, and to compare the sensed power level to the context threshold associated with the clutter context, the at least one processor is configured to:

compare the sensed power level to a full-duplex threshold associated with self-interference caused by a transmit operation at the apparatus.

4. The apparatus of claim 1, wherein the clutter context indicates an existence of clutter reflection, and to compare the sensed power level to the context threshold associated with the clutter context, the at least one processor is configured to:

compare the sensed power level to a clutter reflection threshold associated with clutter interference caused by a transmission.

5. The apparatus of claim 1, wherein to determine whether to operate on the channel in the full-duplex mode, the at least one processor is configured to:

determine to use another channel based at least in part on the sensed power level being greater than the context threshold.

6. The apparatus of claim 1, wherein the at least one processor is further configured to:

operate in the full-duplex mode on the channel; and
perform interference cancellation on data received in a receive operation based on data transmitted in the transmit operations.

7. The apparatus of claim 1, wherein the at least one processor is further configured to:

operate in the full-duplex mode on the channel, the operating including performing receive operations on a same time and frequency resource as the transmit operations.

8. The apparatus of claim 1, wherein the at least one processor is further configured to:

operate in the full-duplex mode on the channel, the operating including performing receive operations on a same time resource and a different frequency resource as the transmit operations.

9. The apparatus of claim 1, wherein the apparatus is a 5G NR base station (gNode B) operating in unlicensed spectrum, or a user equipment communicatively coupled with a gNode B.

10. A method of wireless communication at a wireless apparatus, comprising:

performing transmit operations over a channel;
determining a clutter context of the wireless apparatus;
comparing a sensed power level to a context threshold associated with the clutter context, the sensed power level indicating a power sensed on the channel by the wireless apparatus; and determining whether to operate on the channel in a full-duplex mode based on the comparing, wherein determining whether to operate on the channel in the full-duplex mode comprises;

determining to operate on the channel in the full-duplex mode based at least in part on the sensed power level being less than or equal to the context threshold.

11. The method of claim 10, further comprising:

operating in the full-duplex mode on the channel; and
performing interference cancellation on data received in a receive operation based on data transmitted in the transmit operations.

12. The method of claim 10, further comprising operating in the full-duplex mode on the channel, the operating including performing receive operations on a same time and frequency resource as the transmit operations.

13. The method of claim 10, further comprising operating in the full-duplex mode on the channel, the operating including performing receive operations on a same time resource and a different frequency resource as the transmit operations.

14. The method of claim 10, wherein the wireless apparatus is a user equipment communicatively coupled with a 5G-NR base station (gNodeB) or a user equipment communicatively coupled with a gNodeB.

* * * * *